United States Patent [19]

Nagai

[11] Patent Number: 5,481,462

[45] Date of Patent: Jan. 2, 1996

[54] APPARATUS FOR DETERMINING AN ALTITUDE CONDITION OF AN AUTOMOTIVE VEHICLE

[75] Inventor: Toshinari Nagai, Shizuoka, Japan

[73] Assignee: Toyota Jidosha Kabushiki Kaisha, Toyota, Japan

[21] Appl. No.: 132,317

[22] Filed: Oct. 6, 1993

[30] Foreign Application Priority Data

| Oct. 15, 1992 | [JP] | Japan | 4-277527 |
| Nov. 13, 1992 | [JP] | Japan | 4-304017 |
| Nov. 13, 1992 | [JP] | Japan | 4-304018 |
| Nov. 13, 1992 | [JP] | Japan | 4-304019 |

[51] Int. Cl.$^6$ .............. G06F 19/00; G06G 7/70
[52] U.S. Cl. .............. 364/431.03; 364/431.05; 123/494; 123/488; 123/478; 123/586; 123/487; 73/118.2; 73/113
[58] Field of Search .......... 364/431.01–431.08; 123/478, 494, 416, 417, 480, 486, 677, 492, 487, 440, 586, 587, 41.86, 571, 572, 198 D, 520, 268, 198 F, 275, 443, 699, 298, 488, 688, 430; 60/600, 601, 602, 603, 276, 293, 285; 73/118.2, 113, 3

[56] References Cited

U.S. PATENT DOCUMENTS

| 3,656,460 | 4/1972 | Rogers | 123/572 |
| 4,023,539 | 5/1977 | Noguchi et al. | 123/430 |
| 4,106,443 | 8/1978 | Noguchi | 123/443 |
| 4,153,652 | 5/1979 | Ogita | 123/586 |
| 4,212,065 | 7/1980 | Marchak et al. | 123/486 |
| 4,289,103 | 9/1981 | Shinoda | 123/677 |
| 4,376,431 | 3/1983 | Yokooku et al. | 123/677 |
| 4,437,340 | 3/1984 | Csere et al. | 73/118.2 |
| 4,459,845 | 7/1984 | Keilbach et al. | 73/113 |
| 4,702,080 | 10/1987 | Ueno et al. | 60/602 |
| 4,763,477 | 8/1988 | Sasaki et al. | 60/602 |
| 4,823,270 | 4/1989 | Nagai | 364/431.05 |
| 5,107,724 | 4/1992 | Takizawa | 364/431.05 |
| 5,195,495 | 3/1993 | Kitamoto et al. | 123/520 |
| 5,203,870 | 4/1993 | Kayanuma et al. | 123/520 |
| 5,226,393 | 7/1993 | Nagano et al. | 123/494 |

FOREIGN PATENT DOCUMENTS 3-185250  8/1991  Japan .

*Primary Examiner*—Kevin J. Teska
*Assistant Examiner*—Jacques H. Louis-Jacques
*Attorney, Agent, or Firm*—Oliff & Berridge

[57] ABSTRACT

An altitude determining apparatus for an automotive vehicle includes a calculating part for determining a reference flow rate based on a throttle angle of a throttle valve and an engine speed of an internal combustion engine of the vehicle, the throttle angle being sensed from the throttle valve arranged in an intake passage of the engine and the engine speed being sensed from the engine, a correction part for detecting an operating condition under which additive gas is supplied to the intake passage downstream of the throttle valve and for changing the reference flow rate determined by the calculating part to a second reference flow rate according to the operating condition only when the above mentioned operating condition is detected, and a discriminating part for comparing an intake air flow rate sensed at an inlet portion of the intake passage with a reference flow rate supplied from the correction part and for determining an altitude condition of the vehicle based on the result of the comparison.

12 Claims, 20 Drawing Sheets

VG(V)
OUTPUT VOLTAGE OF
AIR FLOW METER

APPARATUS FOR DETERMINING AN ALTITUDE CONDITION OF AN AUTOMOTIVE VEHICLE

BACKGROUND OF THE INVENTION (1) Field of the Invention

The present invention generally relates to an altitude determining apparatus for an automotive vehicle, and more particularly to an apparatus for determining an altitude condition of an automotive vehicle by comparing an intake air flow rate with a reference flow rate obtained from an engine speed and a throttle angle.

(2) Description of the Related Art

When an automotive vehicle is running in a high altitude condition, an intake air flow rate of the automotive vehicle in response to a throttle angle of a throttle valve becomes smaller than an intake air flow rate in response to the same throttle angle in a low altitude condition since the atmospheric pressure and air density at high altitudes are lower than the atmospheric pressure and air density at low altitudes or the sea level. Thus, when the vehicle is running in a high altitude condition, the output power of the engine becomes lower than a corresponding output power of the engine in a low altitude condition if the throttle valve is set to the same throttle angle. It is necessary to determine an altitude condition of the vehicle in order to suitably control the running of the vehicle.

Japanese Laid-Open Patent Publication No.3-185250 discloses a device for determining an altitude condition of an automotive vehicle. In this device, an intake air flow rate obtained from an air flow meter during the running of the vehicle is compared with a reference flow rate obtained from a sensed engine speed and throttle angle, and an altitude condition of the vehicle is determined based on the result of the comparison. In the above mentioned device, the reference flow rate is read in response to the sensed engine speed and throttle angle from a memory in which a map defining a predetermined characteristic of reference flow rate in the relationship between the engine speed and the throttle angle is stored.

However, in a case of an automotive vehicle having an exhaust gas recirculation system (hereinafter called an EGR system), a certain amount of exhaust gas is fed back to an intake passage of the engine when the engine is subjected to exhaust gas recirculation by the EGR system. As the exhaust gas is mixed with a mixture of intake air and fuel vapor before the mixture is supplied to a combustion chamber of the engine, the combustion temperature is lowered due to the recirculated exhaust gas, in order to reduce the amount of nitrogen oxides (NOx) produced from the engine.

In the vehicle of the type described above, a difference in pressure between an upstream location of the throttle valve in the intake passage and at a downstream location thereof when the EGR is performed becomes smaller, due to the recirculated exhaust gas, than the pressure difference when no EGR is performed. Thus, when the engine is subjected to the EGR, the intake air flow rate becomes smaller than when no EGR is performed if the throttle valve is set to the same throttle angle.

In addition, in a case of an automotive vehicle having an evaporated fuel purge system (hereinafter called an EFP system), a certain amount of fuel vapor is fed into the intake passage of the engine when the engine is operating under prescribed operating conditions. In order to prevent evaporated fuel of a fuel tank from escaping to the atmosphere, fuel vapor of the fuel tank in the EFP system is absorbed in a canister, and the absorbed fuel vapor is fed from the canister into the intake passage due to negative pressure produced in the intake passage. Thus, when the engine is subjected to the evaporated fuel purge (EFP), the intake air flow rate becomes smaller than when no EFP is performed if the throttle valve is set to the same throttle angle.

FIG. 12 schematically shows several characteristics of intake air flow rate GNAFM in response to a throttle angle TA when the vehicle is running under different operating conditions. In FIG. 12, the intake air flow rate GNAFM is measured based on an output voltage of an air flow meter, and the throttle angle TA is measured from a throttle valve. A characteristic of intake air flow rate GNAFM in response to the throttle angle TA when the vehicle is running in a low altitude condition (neither EGR nor EFP performed) is indicated by a one-dot chain line I in FIG. 12. A characteristic of intake air flow rate GNAFM in response to the throttle angle TA when the vehicle is running in a high altitude condition (neither EGR nor EFP performed) is indicated by a two-dot chain line II in FIG. 12. As the air density at high altitudes is lower than the air density at low altitudes, the intake air flow rate GNAFM indicated by the line II (the high altitude condition) is lower than the intake air flow rate GNAFM indicated by the line I (the low altitude condition). Therefore, if the throttle valve is set to the same throttle angle TA, the output power of the engine in the high altitude condition is lower than the output power of the engine in the low altitude condition. During the running of the vehicle in the high altitude condition, if an accelerator pedal is depressed by a vehicle operator to set the throttle valve to a greater throttle angle in order to increase the engine power to a greater power that is the same as that in the low altitude condition, the intake air flow rate GNAFM (indicated by the line II in FIG. 12) is maintained at a constant level and it does not reach the intake air flow rate in the low altitude condition.

In FIG. 12, a solid line III indicates a characteristic of intake air flow rate GNAFM in response to the throttle angle TA when the vehicle is running in the low altitude condition while the EFP is performed, and a dotted line IV indicates a characteristic of intake air flow rate GNAFM in response to the throttle angle TA when the vehicle is running in the low altitude condition while the EGR is performed. Both the intake air flow rates GNAFM indicated by the lines III and IV are lower than the intake air flow rate GNAFM indicated by the line I if the throttle valve is set to the same throttle angle TA. The intake air flow rate measured at the air flow meter when either the EGR or the EFP is performed to supply additive gas to the intake passage of the engine is lower than when neither the EGR nor the EFP is performed if the amounts of air supplied to the combustion chamber of the engine in both cases are equal to each other.

However, when the above conventional device is applied to the automotive vehicles of the types described above, it is impossible to detect whether the intake air flow rate in response to the throttle angle has been lowered due to a high altitude condition or due to the performing of the EFP or EGR. Since the altitude condition of the vehicle is merely determined based on the sensed engine speed and throttle angle, there is a problem in that an erroneous altitude condition may be determined by the above conventional device.

SUMMARY OF THE INVENTION

Accordingly, it is a general object of the present invention to provide an improved altitude determining apparatus in which the above described problems are eliminated.

Another, more specific object of the present invention is to provide an altitude determining apparatus which determines an accurate altitude condition of an automotive vehicle by correcting a reference flow rate or an intake air flow rate in response to operating conditions of the engine under which additive gas is supplied to the intake passage of the engine.

The above mentioned objects of the present invention are achieved by an altitude determining apparatus which includes a calculating part for determining a reference flow rate based on a throttle angle of a throttle valve and an engine speed of an internal combustion engine of the vehicle, the throttle angle being sensed from the throttle valve arranged in an intake passage of the engine, and the engine speed being sensed from the engine, a correction part for detecting an operating condition of the engine under which additive gas is supplied to the intake passage downstream of the throttle valve, and for changing the reference flow rate determined by the calculating part to a second reference flow rate according to the operating condition only when the operating condition is detected, and a discriminating part coupled to the correction part for comparing an intake air flow rate sensed at an inlet portion of the intake passage with a reference flow rate supplied from the correction part, and for determining an altitude condition of the automotive vehicle based on the result of the comparison. According to the present invention, the influence of additive gas (exhaust gas from the EGR system or fuel vapor from the EFP system) supplied to the intake passage on the reference flow rate or the influence of the additive gas on the sensed intake air flow rate can be eliminated. Thus, it is-possible to determine an accurate altitude condition of the vehicle.

BRIEF DESCRIPTION OF THE DRAWINGS

The above and other objects, features and advantages of the present invention will become apparent from the following detailed description when read in conjunction with the accompanying drawings in which.

DESCRIPTION OF THE PREFERRED EMBODIMENTS

A description will now be given of a first embodiment of the altitude determining apparatus according to the present invention.

Figure 2:
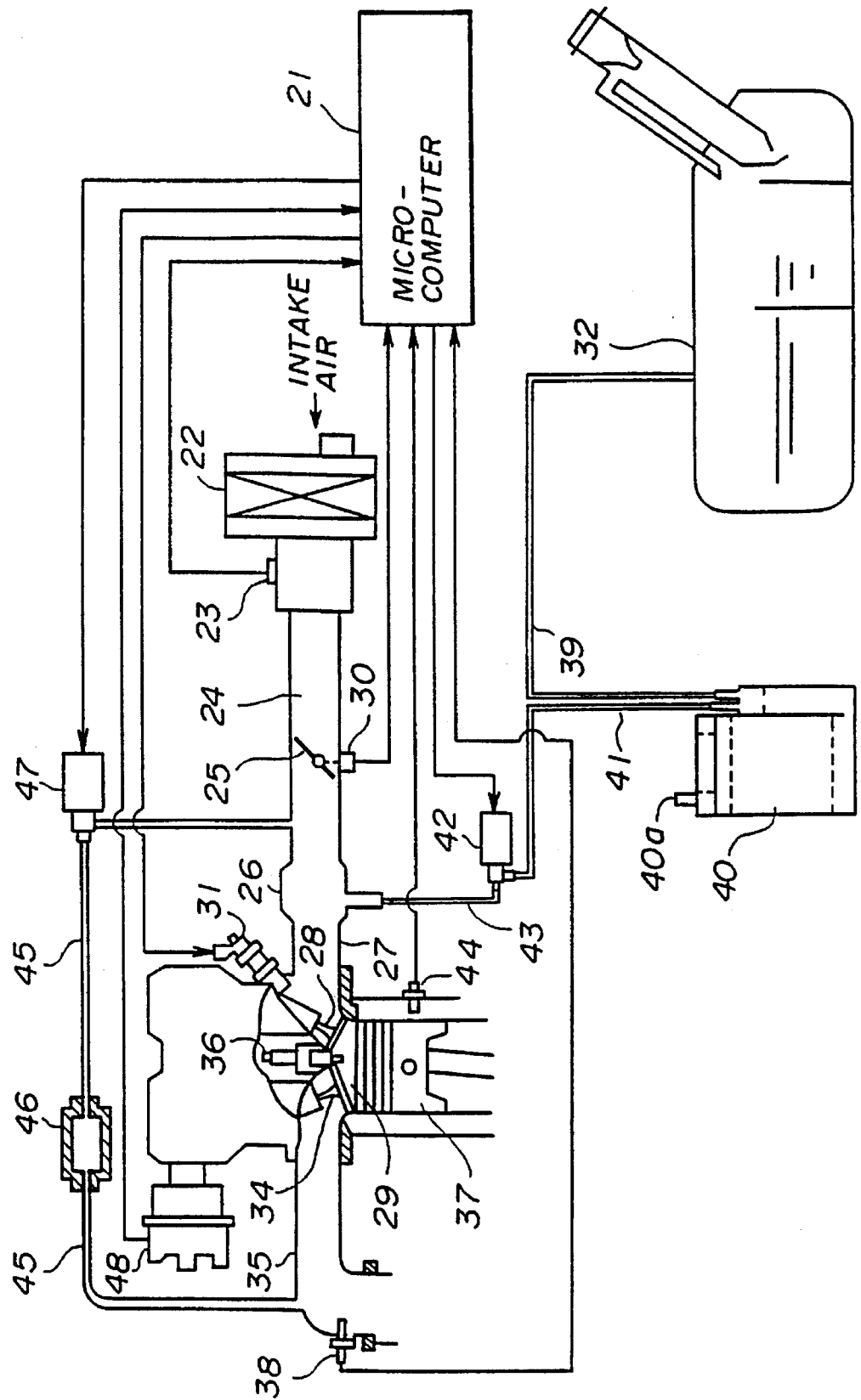
FIG. 2 is a system diagram showing a system of an automotive vehicle to which the present invention is applied.

FIG. 2 shows a system of an automotive vehicle to which the first embodiment of the present invention is applied. In FIG. 2, intake air enters an intake pipe 24 of the engine from an air cleaner 22 mounted at a leading end of the intake pipe 24, and the air cleaner 22 serves to remove dust or foreign matter from the intake air. An air flow meter 23 is mounted at a portion of the intake pipe 24 near the air cleaner 22, and an intake air flow rate at the inlet of the intake pipe 24 is measured by the air flow meter 23. A throttle valve 25 is mounted at an intermediate portion of the intake pipe 24, and the flow of the intake air is controlled by setting the throttle valve 25 to a desired throttle angle. The other end of the intake pipe 24 is connected to an intake manifold 27 of the engine via a surge tank 26. The intake air passing through the surge tank 26 is fed into a combustion chamber 29 of the engine via an intake valve 28 during a time period for which the intake valve 28 is opened. For the sake of convenience, only one cylinder among a plurality of cylinders of the engine is shown in FIG. 2, and only the parts relating to this cylinder are shown in FIG. 2.

The throttle valve 25 is set to a throttle angle according to a position of an accelerator pedal (not shown) when it is depressed by a vehicle operator, and the throttle angle of the throttle valve 25 is sensed by a throttle position sensor 30 mounted on the intake pipe 24 in the vicinity of the throttle valve 25. A fuel injection valve 31 relating to the engine cylinder shown is arranged on the engine, and it partially projects into the intake manifold 27. The other fuel injection valves relating to the other engine cylinders are arranged on the multi-cylinder engine. In FIG. 2, however, these valves are not shown for the sake of convenience. During an fuel injection time according to a control signal supplied from a microcomputer 21, the fuel injection valve 31 injects fuel, supplied from a fuel tank 32 through a fuel supply pipe (not shown), to the inside of the intake manifold 27 so that the fuel and the intake air are mixed to make a mixture having a controlled air-fuel ratio.

The combustion chamber 29 of the engine communicates with an exhaust manifold 35 via an exhaust valve 34. In FIG. 2, a spark plug 36 is arranged on the engine, and a leading edge of the spark plug 36 (where a plug gap is formed) projects into the combustion chamber 29. In the engine cylinder shown in FIG. 2, a piston 37 is movably arranged, and it moves up and down within the cylinder during operation of the engine. An oxygen sensor 38 is arranged on the exhaust manifold 36, and a concentration of oxygen gas in exhaust gas in the exhaust manifold 36 is sensed by this oxygen sensor 38.

In the system shown in FIG. 2, an evaporated fuel purge (EFP) system is provided in order to supply fuel vapor (additive gas) from a canister 40 to the intake pipe 24 downstream of the throttle valve 25. In addition to fuel supplied from the fuel tank to the fuel injection valve, evaporated fuel in the fuel tank is supplied to the canister 40 via a vapor passage 39. The canister 40 contains an absorbent such as active carbon for absorbing evaporated fuel or fuel vapor supplied from the fuel tank 32. The canister 40 is provided with an air inlet opening 40a leading to the atmosphere. A purge passage 41 is connected at one end to the canister 40, and the other end of the purge passage 41 is connected to a first port of a purge control vacuum switching valve (VSV) 42. A second port of the purge control VSV 42 is connected to one end of a purge passage 43, and the other end of the purge passage 43 is connected to the surge tank 26 of the intake pipe 24.

The purge control VSV 42 is switched on and off according to a control signal supplied from the microcomputer 21. During an on-time of the purge control VSV 42 that the VSV 42 is switched on, the VSV 42 is opened to supply fuel vapor from the canister 40 to the surge tank 26 of the intake pipe 24 through the purge passage 43.

In the system shown in FIG. 2, a water temperature sensor 44 is arranged at an inside wall of the engine block, and a temperature THW of engine cooling water is sensed by this water temperature sensor 44. A rotation angle sensor 48 is connected to a rotating shaft of a distributor of the engine, and an engine speed NE (expressed in revolutions per minute) equivalent to a rotating speed of the engine crankshaft is sensed by the rotation angle sensor 48.

In the system shown in FIG. 2, evaporated fuel of the fuel tank 32 is supplied to the canister 40 through the vapor passage 39, and a certain amount of fuel vapor supplied from the fuel tank 32 is absorbed by the absorbent of the canister 40. Thus, the evaporated fuel purge system of this vehicle serves to prevent the evaporated fuel of the fuel tank 32 from escaping from the vehicle to the atmosphere. During an on-time of the purge control VSV 42, the purge control VSV 42 is opened, and external air enters the canister 42 from the air inlet opening 40a due to a negative pressure of intake air in the intake pipe 24 when the engine is operating under prescribed operating conditions. A certain amount of fuel vapor is desorbed from the absorbent of the canister 40 due to the external air, and such fuel vapor is fed into the surge tank 26 of the intake pipe 24 through the purge passage 43 due to a negative pressure of intake air in the intake pipe 24 when the purge control VSV 42 is opened.

In addition, in the system shown in FIG. 2, an exhaust gas return passage 45, which constitutes a part of an exhaust gas recirculation (EGR) system, is provided in order to supply exhaust gas (the additive gas) from the exhaust manifold 35 of the engine to the intake pipe 24 downstream of the throttle valve 25. One end of the exhaust gas return passage 45 is connected to the exhaust manifold 35 upstream of the oxygen sensor 38, and the other end of the passage 45 is connected to the intake pipe 24 downstream of the throttle valve 25. An EGR cooler 46 and an EGR control vacuum switching valve 47 (hereinafter called an EGR valve 47) are arranged at intermediate portions of the exhaust gas return passage 45.

The EGR cooler 46 is provided in order to cool the temperature of exhaust gas passing through the exhaust gas return passage 45 to a lower temperature. The EGR valve 47 is switched on and off according to a control signal supplied from the microcomputer 21. More specifically, a duty ratio of an on-time of the EGR valve 47 to a total duty-cycle time is indicated by the control signal supplied from the microcomputer 21, and a valve opening position of the EGR valve 47 is set to a position according to the duty ratio indicated by the control signal from the microcomputer 21. In the EGR system shown in FIG. 2, a flow rate of exhaust gas supplied to the intake pipe 24 through the exhaust gas return passage 45 is controlled by setting the EGR valve 47 to a desired valve opening position.

Figure 3:
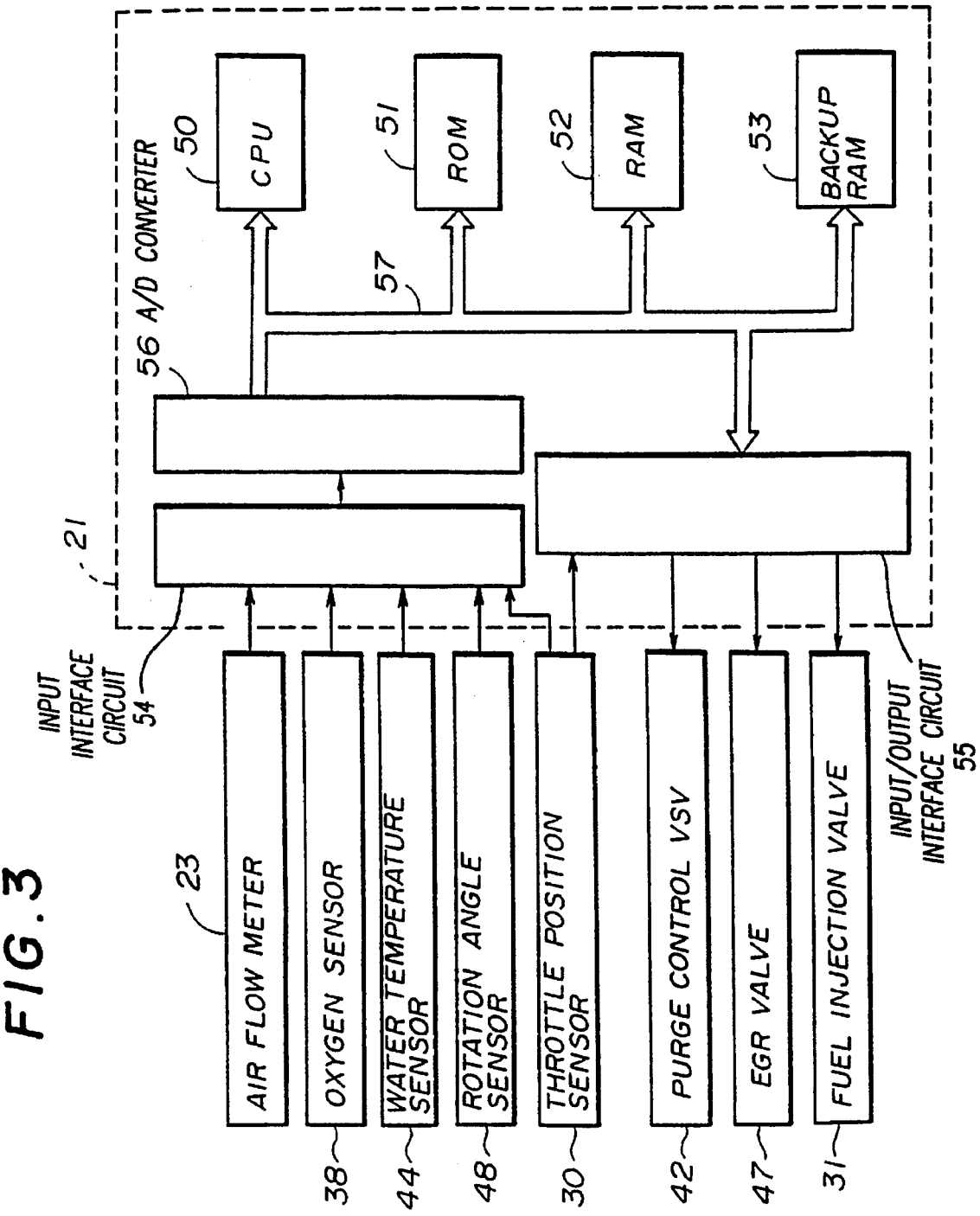
FIG. 3 is a block diagram showing a microcomputer of the system shown in FIG. 2.

FIG. 3 shows a construction of the microcomputer 21 of the system shown in FIG. 2. In FIG. 3, the parts which are the same as corresponding parts shown in FIG. 2 are designated by the same reference numerals, and a description thereof will be omitted. As shown in FIG. 3, the microcomputer 21 includes a central processing unit (CPU) 50, a read only memory (ROM) 51, a random access memory (RAM) 52, a backup RAM 53, an input interface circuit 54 (which has a multiplexer), an input/output interface circuit 55, and an analog-to-digital (A/D) converter 56 coupled to the input interface circuit 54. These component parts of the microcomputer are interconnected by a system bus 57 as shown in FIG. 3.

The ROM 51 in FIG. 3 stores control programs and parameters used by the CPU 50 when an altitude determining procedure according to the present invention is performed. The RAM 52 is used as a work area when the altitude determining procedure is performed. The backup RAM 53 retains necessary data after the engine stops operating. A signal indicating an intake air flow rate sensed by the air flow meter 23, a signal indicating an oxygen gas concentration sensed by the oxygen sensor 38, a signal indicating an engine cooling water temperature sensed by the water temperature sensor 44, and a signal indicating a throttle angle sensed by the throttle position sensor 30 are supplied to the input interface circuit 54. These input signals are processed in a parallel manner by the input interface circuit 54, and a sequence of processed signals of the above mentioned sensors is supplied from the input interface circuit 54 to the A/D converter 56. The processed signals of the sensors are sequentially converted by the A/D converter 56 into digital signals, and the digital signals are sequentially transferred from the A/D converter 56 to the CPU 50 via the bus 57.

A signal indicating a throttle angle sensed by the throttle position sensor 30 is supplied to the input/output interface circuit 55 shown in FIG. 3, and this signal is sent from the input/output interface circuit 55 to the CPU 50 via the bus 57. On the other hand, one of several control signals supplied from the CPU 50 via the bus 57 is selected by the input/output interface circuit 55, and the control signal selected is transferred from the input/output interface circuit 55 to the fuel injection valve 31, the EGR valve 47, or the purge control VSV 42. Thus, the operation of each of these three valves 31, 47 and 42 is controlled in accordance with a control signal supplied from the microcomputer 21.

Figure 1:
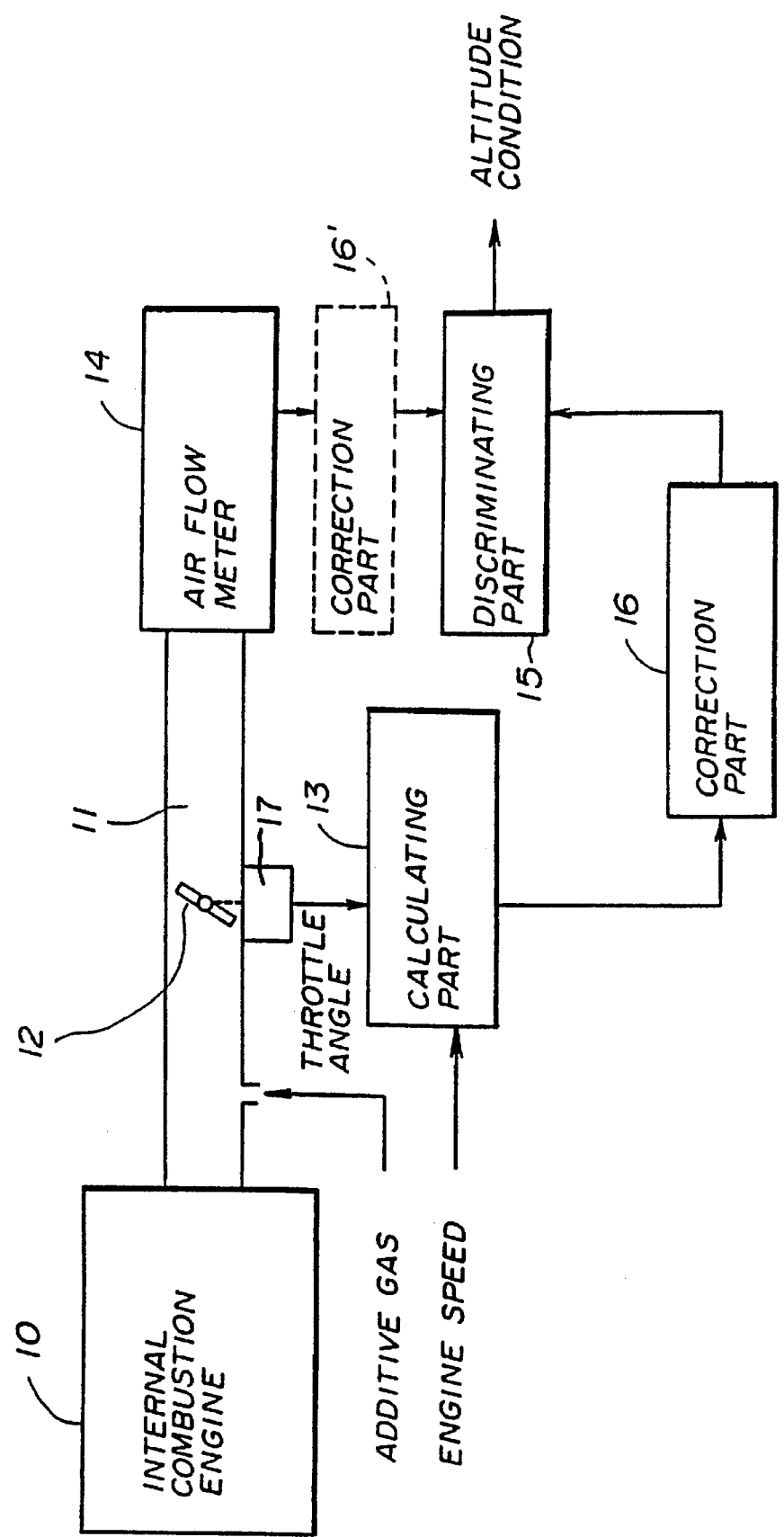
FIG. 1 is a block diagram showing a first embodiment of the altitude determining apparatus according to the present invention.

FIG. 1 shows the first embodiment of the altitude determining apparatus according to the present invention. This embodiment is applied to the automotive vehicle shown in FIG. 2. As shown in FIG. 1, the altitude determining apparatus includes a calculating part 13 for determining a reference flow rate based on a throttle angle of a throttle valve 12 and an engine speed of an internal combustion engine 10. The throttle angle is sensed by a throttle position sensor from the throttle valve 12 arranged in an intake passage 11 of the engine 10. The engine speed is sensed by a rotation angle sensor from the engine 10.

The altitude determining apparatus in FIG. 1 includes a correction part 16 for detecting an operating condition of the engine 10 under which additive gas is supplied to the intake passage 11 downstream of the throttle valve 12, and for changing the reference flow rate determined by the calculating part 13 to a second reference flow rate according to the operating condition when the operating condition is detected.

The altitude determining apparatus in FIG. 1 further includes a discriminating part 15 for comparing an intake air flow rate sensed by an air flow meter 14 at an inlet portion of the intake passage 11 with the second reference flow rate produced by the correction part 16, and for determining an altitude condition of the vehicle based on the result of the comparison. Thus, it is possible to determine an accurate altitude condition of the vehicle because the influence of additive gas (supplied from the EGR system or the EFP system to the intake passage) on the reference flow rate determined by the calculating part can be eliminated.

Next, the operation of the first embodiment of the altitude determining apparatus shown in FIG. 1 will be described in greater detail with reference to FIGS. 4 through 7.

Figure 4:
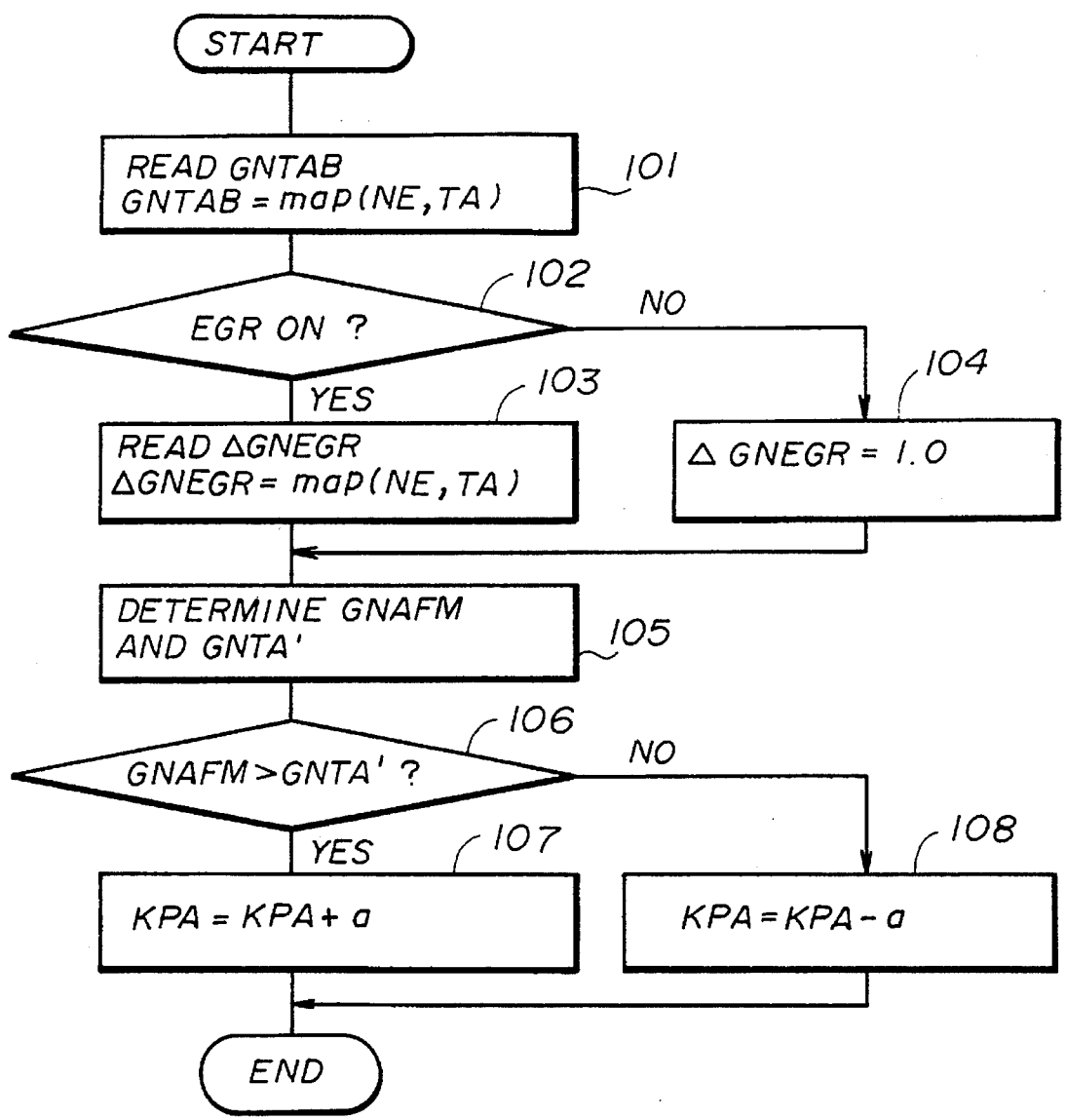
FIG. 4 is a flow diagram for explaining a procedure for determining an atmospheric pressure correction factor which procedure is performed by the microcomputer shown in FIG. 3.

FIG. 4 shows a procedure of the first embodiment for determining an atmospheric pressure correction factor KPA which procedure is performed by the microcomputer shown in FIG. 3. This procedure is performed to correctly determine an altitude condition of an automotive vehicle of the type including the EGR system. The functions of the calculating part 13, the correction part 16 and the discriminating part 15 described above are realized by performing the procedure shown in FIG. 4 by means of the microcomputer 21.

Figure 5:
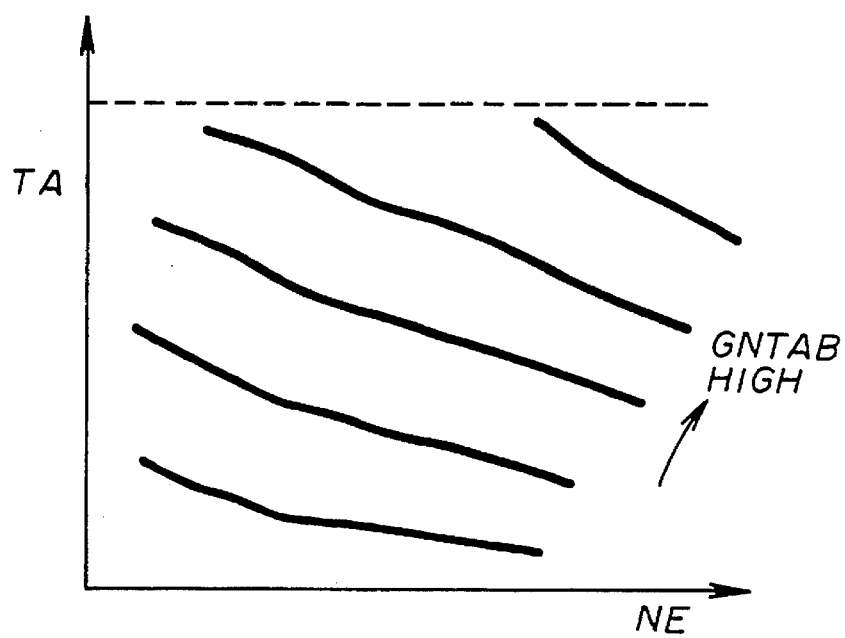
FIG. 5 is a chart showing the characteristic of a reference flow rate in the relationship between the engine speed and the throttle angle.

The KPA determining procedure in FIG. 4 is repeatedly performed by the microcomputer 21 at given time intervals (for example, every 65 milliseconds). When this procedure is started, the CPU 50 reads in step 101 a reference flow rate GNTAB from the ROM 51 based on the engine speed NE sensed by the rotation angle sensor 48 and based on the throttle angle TA sensed by the throttle position sensor 30. This reference flow rate GNTAB is an intake air flow rate of the vehicle measured under standard conditions of temperature and pressure (at the sea level), and the GNTAB is a basic value on which an altitude condition of the vehicle is determined. In the ROM 51, a map defining the characteristic of the thus measured reference flow rate GNTAB in the relationship between the engine speed NE and the throttle angle TA is stored. FIG. 5 shows the characteristic of the reference flow rate GNTAB in the relationship between the engine speed NE and the throttle angle TA.

After step 101 is performed, step 102 detects whether the EGR valve 47 is switched on according to a control signal supplied from the CPU 50. If the answer to step 102 is affirmative, the engine is subjected to the exhaust gas recirculation and a certain amount of exhaust gas is supplied to the intake passage of the engine. Thus, in step 103, the CPU 50 reads a correction factor Δ GNEGR from the ROM 51 based on the engine speed NE and the throttle angle TA. In the ROM 51, a map defining the characteristic of the correction factor Δ GNEGR in the relationship between the engine speed NE and the throttle angle TA is stored.

Figure 6:
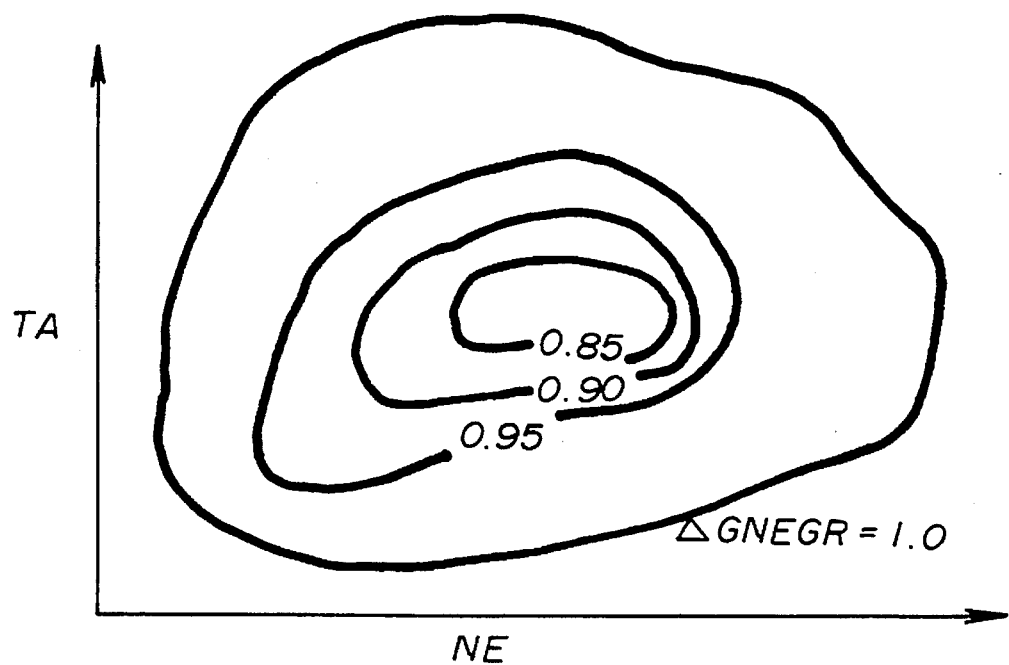
FIG. 6 is a chart showing the characteristic of a correction factor in the relationship between the engine speed and the throttle angle.

FIG. 6 shows the characteristic of the correction factor Δ GNEGR in the relationship between the engine speed NE and the throttle angle TA. In the first embodiment of the present invention, the correction factor is used to detect the ratio of the additive gas (the exhaust gas supplied from the EGR valve 47 to the intake pipe 24) relative to the total intake air (supplied to the combustion chamber 29 of the engine). For example, when the correction factor Δ GNEGR read by the CPU 50 is "0.85", it indicates that the ratio of the additive gas relative to the total intake air is equal to 0.15 (=1−0.85). That is, the exhaust gas supplied from the EGR valve 47 to the intake pipe 24 is equivalent to 15% of the total intake air supplied to the combustion chamber 29 of the engine.

If the answer to step 102 is negative, no exhaust gas is supplied from the EGR valve 47 to the intake pipe 24. In other words, all the intake air supplied to the combustion chamber 29 of the engine is the intake air passing through the air flow meter 22. Thus, in step 104, the CPU 50 sets the correction factor Δ GNEGR to be 1.0.

After the correction factor is determined in either step 103 or step 104, the CPU 50 determines an intake air flow rate GNAFM based on the output voltage VG of the air flow meter 23 in step 105, and determines a second reference flow rate GNTA' based on the reference flow rate GNTAB and the correction factor Δ GNEGR in step 105.

Figure 7:
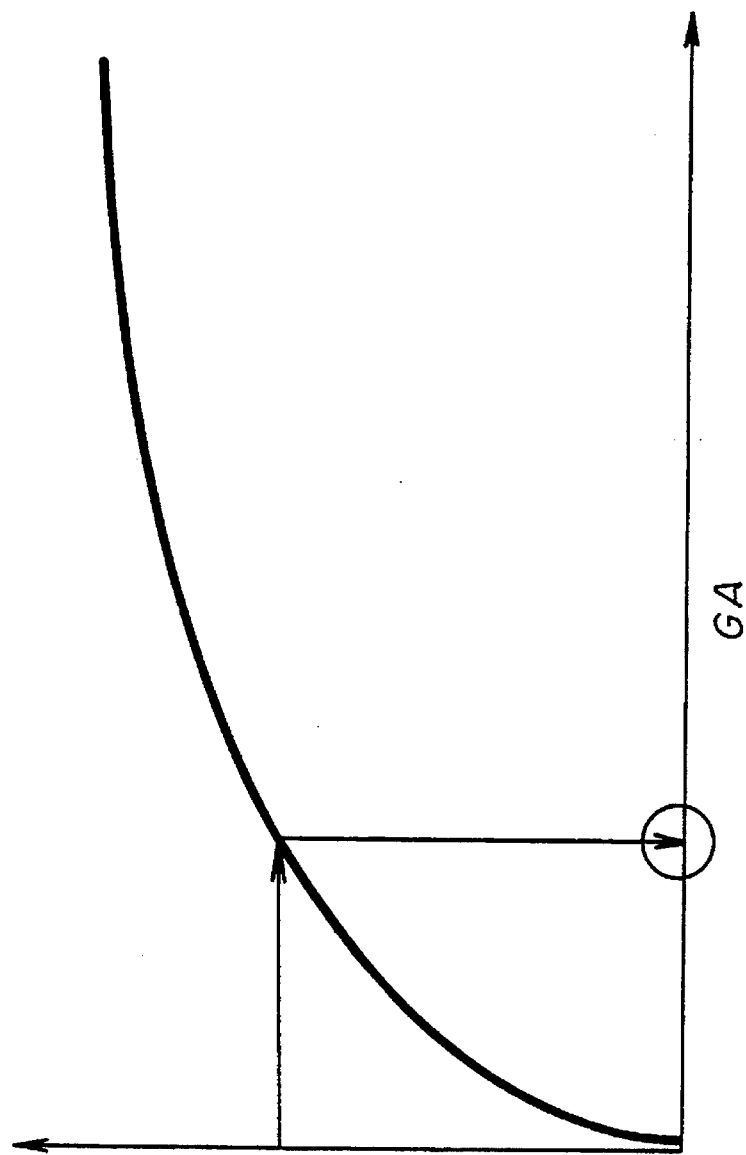
FIG. 7 is a chart showing the relationship between the air flow rate and the air flow meter voltage, the air 1 flow rate used to determine an intake air flow rate.

In step 105, the intake air flow rate GNAFM indicates the weight amount of intake air being supplied per revolution of the engine (expressed in grams per revolution). In order to determine an intake air flow rate GNAFM, the CPU 50 reads an air flow rate GA (expressed in grams per second) from the ROM 51 based on the output voltage VG (expressed in volts) of the air flow meter 23. In the ROM 51, a map defining the relationship between the air flow rate GA and the air flow meter voltage VG is stored. FIG. 7 shows the relationship between the air flow rate GA and the air flow meter voltage VG stored in the ROM 51. Then, the CPU 50 determines an intake air flow rate GNAFM based on the air flow rate GA and the engine speed NE (expressed in revolutions per minute), as in the following equation.

$$GNAFM=[(n-1) \times GNAFMold' + GNAFM']/n \quad (1)$$

where:

$$GNAFM'=GA \times 60/NE, \quad (2)$$

"n" denotes an integer equal to 32 or 64, GNAFMold' denotes a previously determined value of the intake air flow rate GNAFM'.

In addition, the CPU 50 determines a second reference flow rate GNTA' based on the reference flow rate GNTAB and the correction factor Δ GNEGR, as in the following equation.

$$GNTA' = GNTAB \times KPA \times \Delta GNEGR \quad (3)$$

where

KPA denotes a previously determined value of the atmospheric pressure correction factor.

After step 105 is performed, the CPU 50 detects whether the intake air flow rate GNAFM is greater than the second reference flow rate GNTA' in step 106. In this embodiment, the CPU 50 updates or determines the atmospheric pressure correction factor KPA based on the result of this comparison. According to the present invention, the KPA is the ratio of the atmospheric pressure at the altitude of the vehicle to a given standard atmospheric pressure (760 mmHg). Thus, if the atmospheric pressure correction factor KPA is determined, an altitude condition of the vehicle can be easily and correctly determined based on the KPA.

If the answer to step 106 is affirmative (GNAFM>GNTA'), it is determined that the KPA has changed to a relatively small value. In other words, in the current altitude condition, the vehicle is running on a downhill road. Step 107 increments the atmospheric pressure correction factor KPA by adding a given value "a" thereto (KPA=KPA+a). The KPA determining procedure shown in FIG. 4 is finished.

If the answer to step 106 is negative (GNAFM≦GNTA'), it is determined that the second reference flow rate GNTA' according to which the KPA is determined has changed to a relatively large value. In other words, in the current altitude condition, the vehicle is running on an uphill road. Step 108 decrements the atmospheric pressure correction factor KPA by subtracting the given value "a" therefrom (KPA=KPA−a). The KPA determining procedure shown in FIG. 4 is finished.

Figure 8:
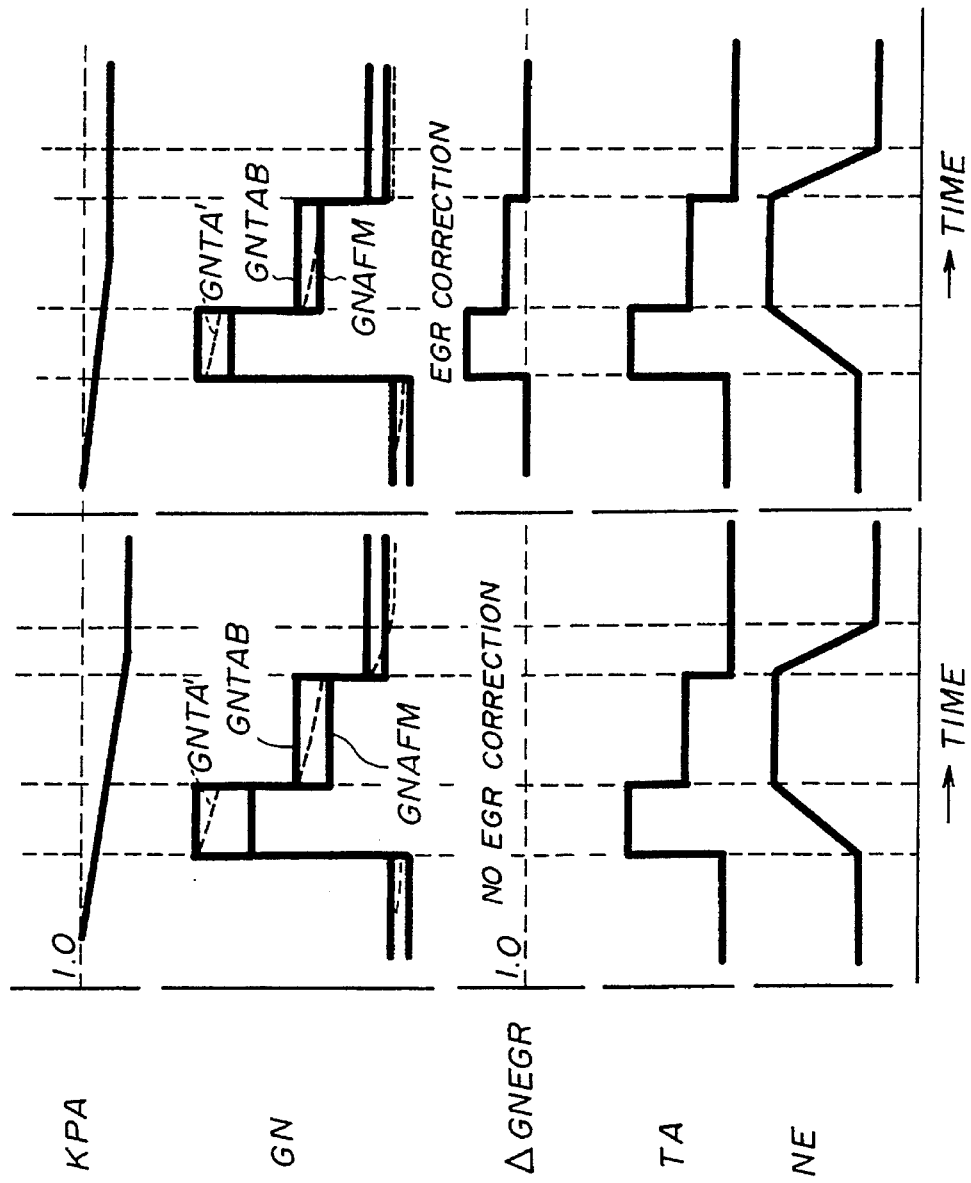
FIGS. 8A and 8B are timing charts for explaining the operations of a conventional altitude determining apparatus and the altitude determining apparatus of the present invention when the procedure in FIG. 4 is performed.

In a case of a conventional altitude determining apparatus, no correction process using a correction factor Δ GNEGR read from the ROM 51 is performed (or the Δ GNEGR is always equal to 1.0), and the updating of the atmospheric pressure correction factor KPA based on the correction factor is not performed. FIG. 8A is a timing chart for explaining the operation of the conventional altitude determining apparatus. In this example, the intake air flow rate GNTAB and the reference air flow rate GNTA' are changed to be equal to values according to the sensed engine speed NE and throttle angle TA. However, the Δ GNEGR is always equal to 1.0, and the intake air flow rate GNAFM obtained from the air flow meter 23 is lowered to a smaller value when the EGR is performed. Thus, the atmospheric pressure correction factor KPA is changed to an excessively small value due to the EGR, as indicated in FIG. 8A.

On the other hand, in the case of the KPA determining apparatus of the first embodiment, the above described correction process using a correction factor Δ GNEGR read from the ROM 51 is performed, and the atmospheric pressure correction factor KPA based on the correction factor is performed. FIG. 8B shows the operation of the altitude determining apparatus when the procedure shown in FIG. 4 is performed. After the intake air flow rate GNTAB and the second reference air flow rate GNTA' are determined based on the sensed engine speed NE and throttle angle TA, the correction factor Δ GNEGR is read from the ROM 51 when the EGR is performed, such that the second reference flow rate GNTA' is changed to be equal to the intake air flow rate GNTAB as indicated in FIG. 8B. Based on the result of the comparison of the GNTAB with the GNTA', the atmospheric pressure correction factor KPA is updated so as to indicate an accurate atmospheric pressure condition of the vehicle when the EGR is performed. Thus, according to the present invention, it is possible to determine an accurate altitude condition of the vehicle based on the atmospheric pressure correction factor KPA, even when the EGR is performed.

In the above described procedure, the reference flow rate GNTAB read from the ROM 51 (the map shown in FIG. 5) is changed based on the correction factor Δ GNEGR read from the ROM 51 (the map shown in FIG. 6) in order to determine a second reference flow rate GNTA'. However, the correction part 16 of the present invention is not limited to this embodiment. The above mentioned function of the correction part 16 of the present invention can be achieved by making use of the ROM 51 in which a first map defining the characteristic of a first reference flow rate GNTAB when no EGR is performed and a second map defining the characteristic of a second reference flow rate GNTA' when the EGR is performed are stored.

In addition, in order to determine a more accurate altitude condition of the vehicle, the altitude determining apparatus shown in FIG. 1 can be provided with a second correction part 16' for detecting an intake air flow rate sensed by the air flow meter 14 (the output voltage thereof) at an inlet portion of the intake passage 11, and for changing the intake air flow rate to a second intake air flow rate according to an operating condition of the engine under which additive gas is supplied to the intake passage 11 downstream of the throttle valve 12 only when it is detected. This second correction part 16' is shown by a dotted line in FIG. 1.

Figure 9:
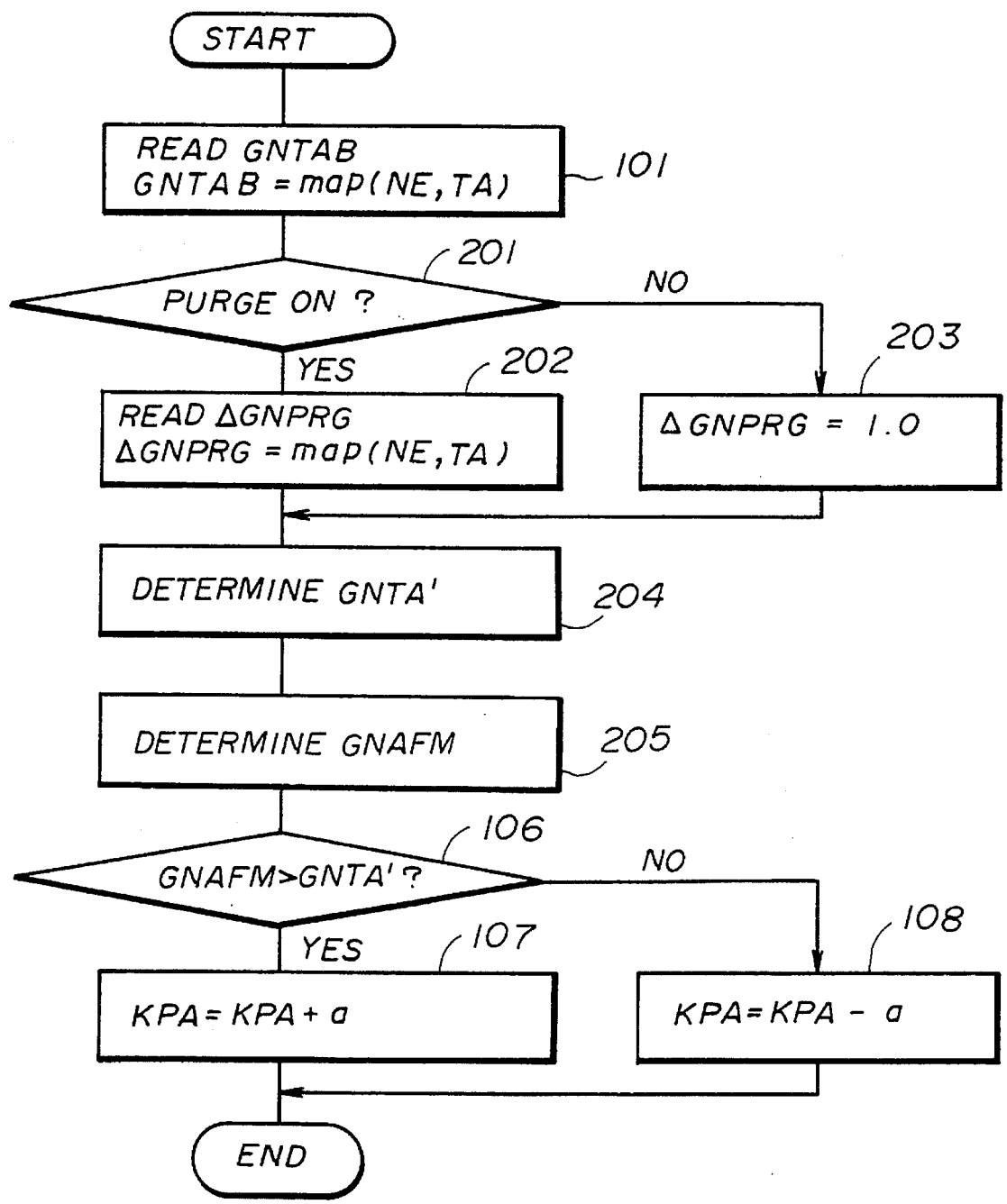
FIG. 9 is a flow diagram for explaining another procedure for determining an atmospheric pressure correction factor which procedure is performed by the microcomputer shown in FIG. 3.

Next, a description will be given, with reference to FIG. 9, of another procedure for determining an atmospheric pressure correction factor KPA which procedure is performed by the microcomputer in FIG. 3. In FIG. 9, the steps which are the same as corresponding steps shown in FIG. 4 are designated by the same reference numerals, and a description thereof will be omitted. The KPA determining procedure shown in FIG. 9 is performed to determine an altitude condition of an automotive vehicle of the type having the evaporated fuel purge (EFP) system described above.

The procedure shown in FIG. 9 is repeatedly performed by the microcomputer 21 at given time intervals. After a reference flow rate GNTAB is read from the ROM 51 based on the sensed engine speed NE and throttle angle TA in step 101, step 201 detects whether the purge control VSV 42 of the evaporated fuel purge system in FIG. 2 is switched on according to a control signal supplied from the CPU 50.

Figure 10:
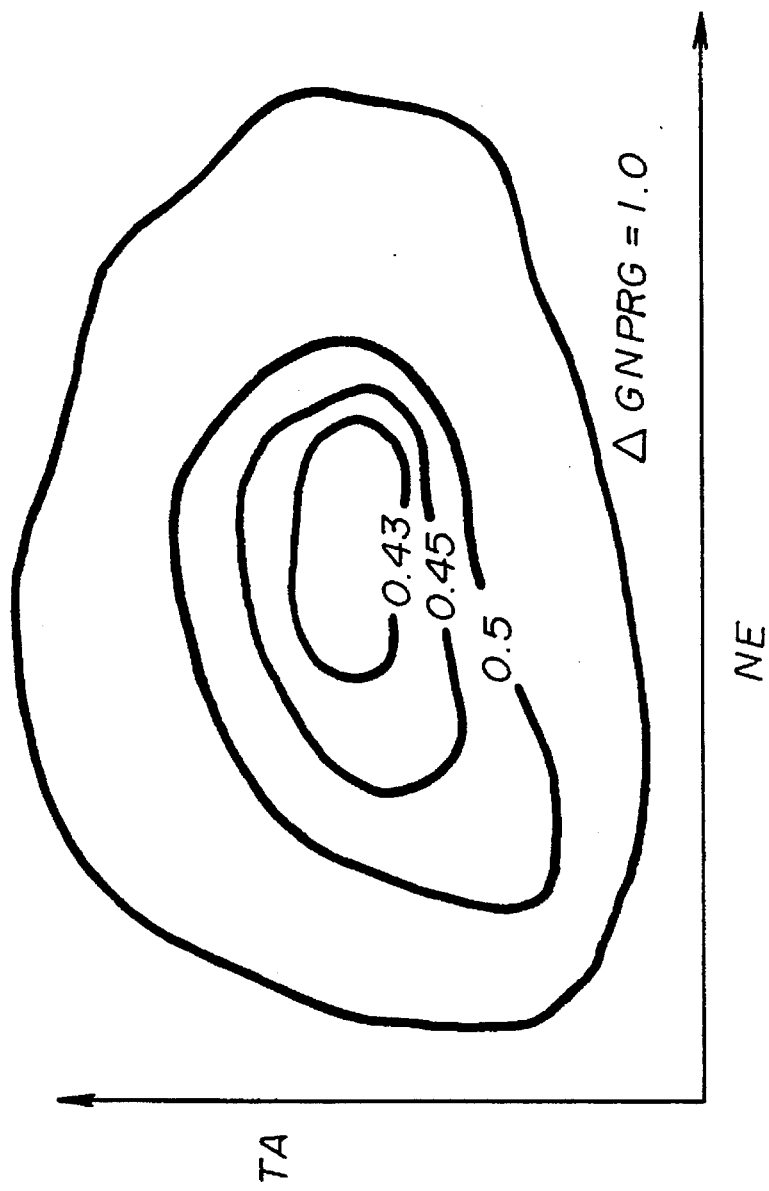
FIG. 10 is a chart showing the characteristic of a correction factor in the relationship between the engine speed and the throttle angle.

If the answer to step 201 is affirmative (the VSV 42 is opened), a certain amount of fuel vapor stored in the canister 40 is fed into the intake passage of the engine through the purge passage 43 (FIG. 2). Thus, in step 202, the CPU 50 reads a correction factor Δ GNPRG from the ROM 51 based on the sensed engine speed NE and throttle angle TA. In the ROM 51, a map defining the characteristic of the correction factor Δ GNPRG in the relationship between the engine speed NE and the throttle angle TA is stored. FIG. 10 shows the characteristic of the correction factor Δ GNPRG in the relationship between the engine speed NE and the throttle angle TA. In this KPA determining procedure, the correction factor Δ GNPRG is used to detect the ratio of the additive gas (the fuel vapor supplied from the canister 40 to the intake pipe 24) relative to the total intake air (supplied to the combustion chamber 29 of the engine). This feature of the correction factor Δ GNPRG is similar to that of the correction factor Δ GNEGR in FIG. 6.

If the answer to step 201 is negative (the VSV 42 is switched off), no fuel vapor is supplied from the canister 40 to the intake pipe 24. In other words, only the intake air passing through the air flow meter 23 is supplied to the combustion chamber 29 of the engine. Thus, in step 203, the CPU 50 sets the correction factor Δ GNPRG to be 1.0.

After the correction factor is determined in either step 202 or step 203, step 204 determines a second reference flow rate GNTA' based on the reference flow rate GNTAB (step 202) and the correction factor Δ GNPRG (step 202), as in the following equation.

$$GNTA' = GNTAB \times KPA \times \Delta GNPRG \qquad (4)$$

where KPA denotes a previously determined value of the atmospheric pressure correction factor.

After step 204 is performed, step 205 determines an intake air flow rate GNAFM based on the output voltage VG of the air flow meter 23, as in the above equations (1) and (2). After the intake air flow rate GNAFM is determined in step 205, step 106 detects whether the intake air flow rate GNAFM (in step 205) is greater than the second reference flow rate GNTA'. In this manner, the CPU 50 updates the atmospheric pressure correction factor KPA based on the result of the above comparison. If the atmospheric pressure correction factor KPA is determined, an altitude condition of the vehicle can be easily and correctly determined based on the KPA.

Figure 11:
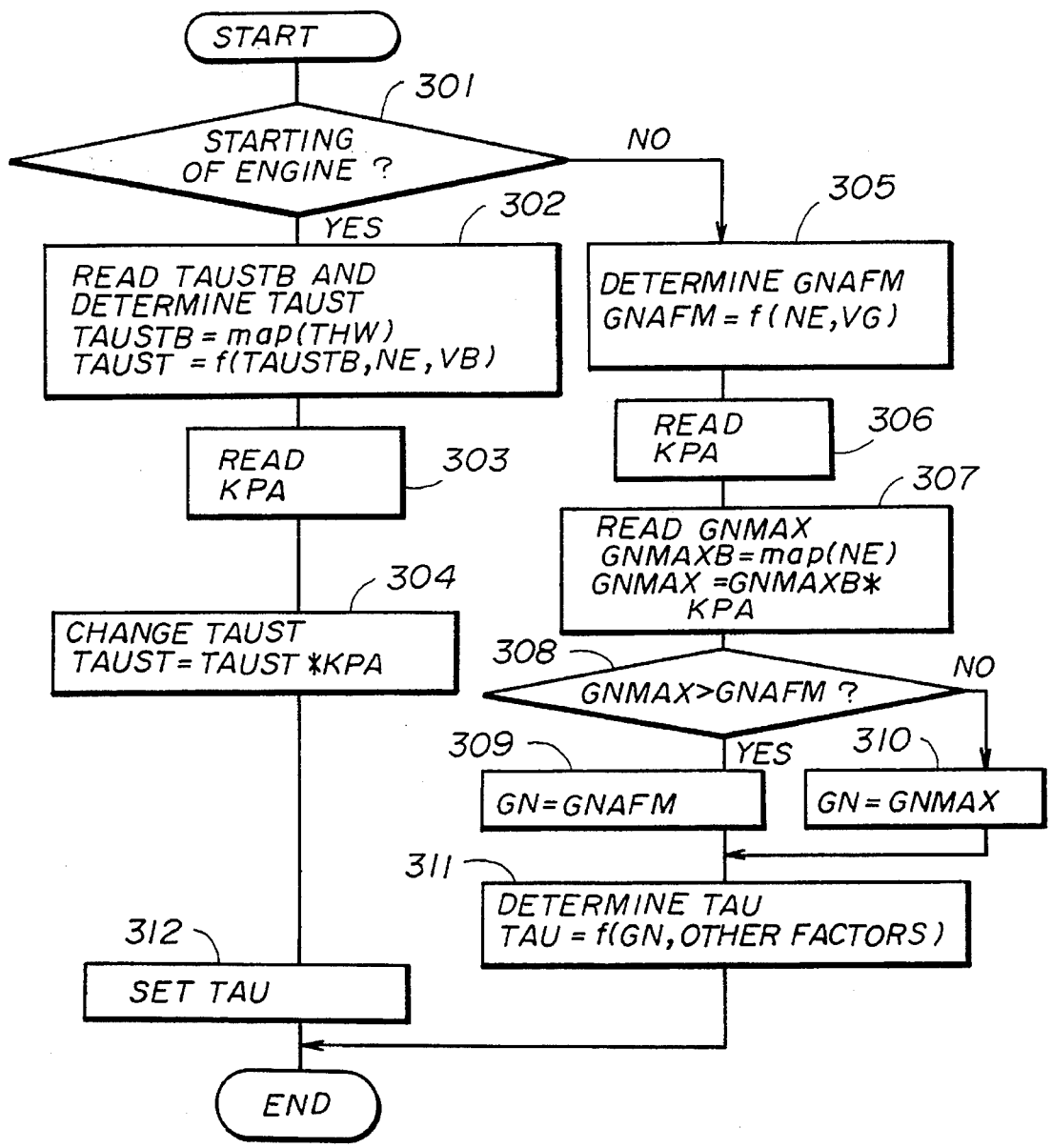
FIG. 11 is a flow diagram for explaining a procedure for determining a fuel injection time and a maximum guard value which procedure is performed by the microcomputer in FIG. 3.
Figure 12:
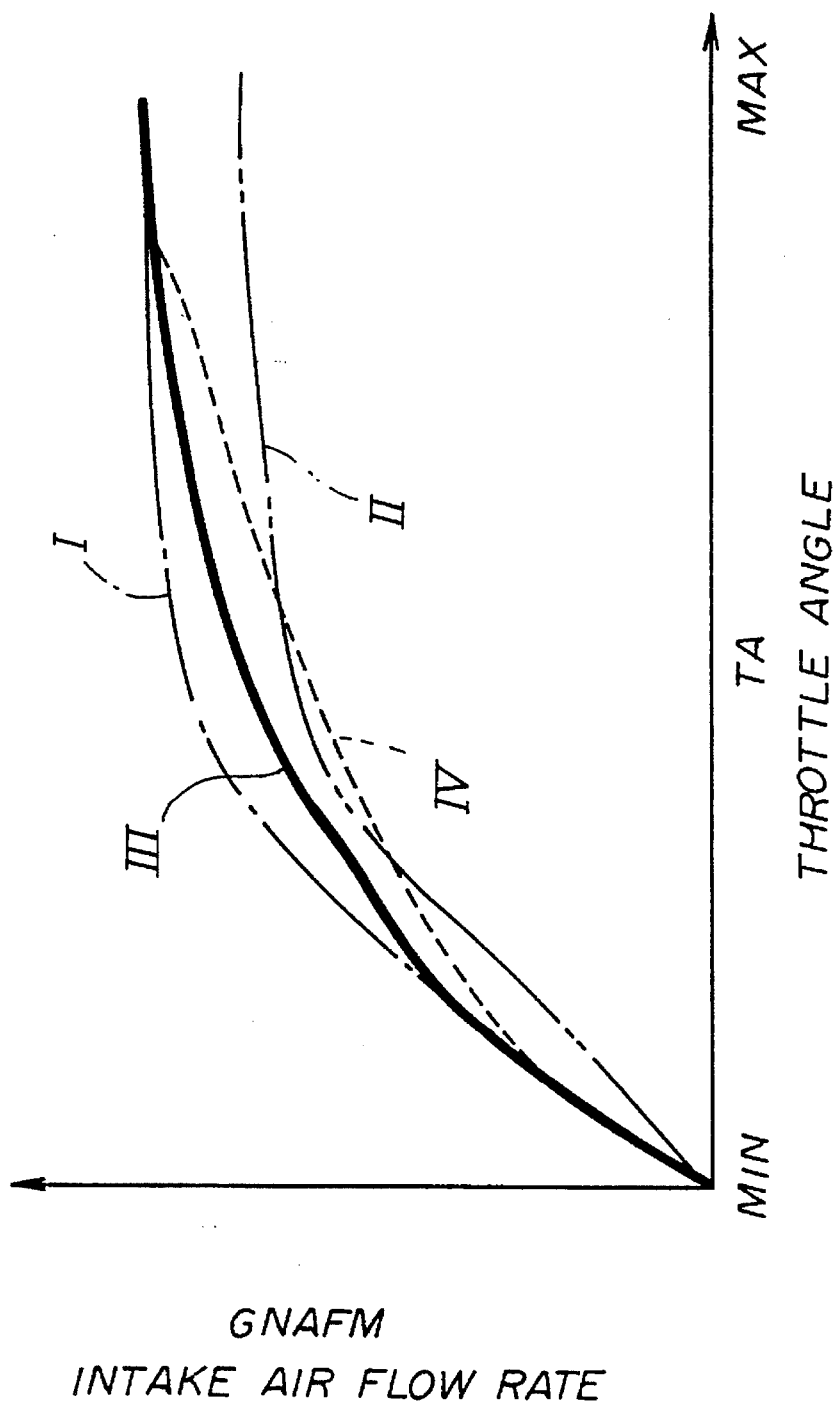
FIG. 12 is a chart showing several characteristics of the intake air flow rate in response to the throttle angle under different operating conditions of the vehicle.

Next, a description will be given, with reference to FIG. 11, of a procedure of the first embodiment for determining a fuel injection time TAUST and a maximum guard value GNMAX based on the atmospheric pressure correction factor KPA determined by the KPA determining procedure shown in FIG. 4 or FIG. 9. FIG. 11 shows the procedure for determining the fuel injection time TAUST and the maximum guard value GNMAX which procedure is performed by the microcomputer 21 in FIG. 3.

When the procedure shown in FIG. 11 is started, the CPU 50 detects whether a starter signal is received and determines whether the operation of the engine is started in step 301. If the answer to step 301 is affirmative, the CPU 50 reads out a basic fuel injection time TAUSTB from the ROM 51 based on the engine cooling water temperature THW sensed by the water temperature sensor 44 in step 302. In the ROM 51, a map defining the relationship of the basic fuel injection time TAUSTB relative to the THW is stored. In step 302, the CPU 50 determines a fuel injection time TAUST (supplied to the fuel injection valve 31 at the time of the starting of the engine operation) based on the basic fuel injection time TAUSTB, the engine speed NE and the battery voltage VB, in accordance with a prescribed calculation formula f(TAUST, NE, VB).

In step 303, the CPU 50 reads the atmospheric pressure correction factor KPA (determined by the KPA determining procedure shown in FIG. 4 or FIG. 9) from the RAM 52. In step 304, the CPU 50 changes the fuel injection time TAUST to a second fuel injection time TAUST' by multiplying the fuel injection time TAUST (step 302) by the atmospheric pressure correction factor KPA (step 303).

At the starting of the engine operation, the rotation speed of the cranking is relatively low and a stable output signal is not supplied by the air flow meter 23 to the CPU 50. For this reason, a calculation of the fuel injection time based on the sensed engine speed and intake air flow rate is not performed when the operation of the engine starts operating. As described above, the fuel injection time TAUST is determined based on the basic fuel injection time read from the ROM 51. However, when the vehicle is at high altitudes, the air density is very low and the air fuel mixture supplied to the combustion chamber 29 of the engine becomes rich, which causes a poor driveability at the starting of the engine operation. By applying the second fuel injection time TAUST' determined from the atmospheric pressure correction factor KPA in step 304, it is possible to prevent the air fuel mixture at the starting of the engine operation from becoming rich in a high altitude condition. If the second fuel injection time TAUST' determined based on the KPA is applied, the air fuel mixture when the vehicle is in a high altitude condition can be adjusted to be at a desired air fuel ratio.

If the answer to step 301 is negative (the engine operation is not started), step 305 determines an intake air flow rate GNAFM based on the output signal VG of the air flow meter 23, as in the above equations (1) and (2). After step 305 is performed, step 306 reads the atmospheric pressure correction factor KPA determined by the KPA determining procedure shown in FIG. 4 or FIG. 9. This correction factor KPA is used to determine a maximum guard value GNMAX used to control the intake air flow rate GNAFM so as to be lower than the upper limit GN.

After step 306 is performed, in step 307, the CPU 50 reads a basic maximum guard value GNMAXB from the ROM 51 based on the engine speed NE. In the ROM 51, a map defining the relationship of the basic maximum guard value GNMAXB relative to the engine speed NE is stored. In addition, in step 307, the CPU 50 determines a maximum guard value GNMAX by multiplying the basic maximum guard value GNMAXB by the atmospheric pressure correction factor KPA (step 306).

Generally, the intake air flow rate sensed by the air flow meter 23 is influenced by air being fed back from the engine as well as by the intake air passing through the air cleaner 22. The air fed from the intake valve 28 of the engine is sometimes supplied to the intake pipe 24 due to a negative pressure produced during a suction process of the engine operation. For this reason, the intake air flow rate sensed by the air flow meter 23 can be higher than the actual intake air flow rate of the intake passage of the engine. In order to compensate for the intake air flow rate sensed in such a case, the basic maximum guard value GNMAXB read based on the engine speed NE is used to determine a fuel injection time of the valve 31. 1 However, when the vehicle is at high altitudes, the air density is low and the air fuel mixture becomes rich. If a fuel injection time of the valve 31 is determined based on the intake air flow rate for the low altitude condition at this time, the resulting fuel injection time becomes greater than an appropriate value for the high altitude condition. This makes the air fuel mixture of the combustion chamber 29 become rich, which causes a poor driveability of the vehicle at high altitudes. In order to eliminate this problem, the maximum guard value GNMAX is determined by multiplying the basic maximum guard value GNMAXB by the atmospheric pressure correction factor KPA in step 307.

After step 307 is performed, step 308 detects whether the maximum guard value GNMAX (step 307) is greater than the intake air flow rate GNAFM (step 305). If the answer to step 308 is affirmative (GNMAX>GNAFM), it is determined that the sensed intake air flow rate is appropriate. Step 309 sets a second air flow rate GN to be equal to the intake air flow rate GNAFM (GN=GNAFM). If the answer to step 308 is negative (GNMAX≦GNAFM), it is determined that the sensed intake air flow rate is currently too great. Step 310 sets the second air flow rate GN to be equal to the maximum guard value GNMAX (GN=GNMAX).

After the second air flow rate GN is set in step 309 or step 310, step 311 determines a fuel injection time TAU based on the second air flow rate GN and other factors. The second air flow rate GN indicates the amount of intake air per revolution of the engine crankshaft. In step 311, a fundamental fuel injection time TP is calculated based on the second air flow rate GN, and this fundamental fuel injection time TP is changed to a second value based on the concentration of oxygen gas in exhaust gas sensed by the oxygen sensor 38 and based on the other factors. The fuel injection time TAU is set to be the second value in step 311.

After step 304 or step 311 is performed, step 312 sets the fuel injection time TAU to a downcounter of the input/output interface circuit 55 of the microcomputer 21 in FIG. 3 in order to operate the fuel injection valve 31 during the fuel injection time TAU. The procedure shown in FIG. 11 is finished. At the time of the starting of the engine operation, the fuel injection time TAUST' determined in step 304 is set to the downcounter of the circuit 55. After the engine operation is started, the fuel injection time TAU determined in step 311 is set to the downcounter of the input/output interface circuit 55.

As the above described procedure is performed by the microcomputer 21 at the start of the engine operation, the air fuel mixture in the combustion chamber 29) is adjusted by an open-loop control of the fuel injection valve 31 to be equal to a desired air fuel ratio by using the fuel injection time TAUST' (determined from the atmospheric pressure correction factor KPA). After the engine operation is started, the air fuel mixture is adjusted by a feedback control of the fuel injection valve 31 to be equal to a desired air fuel ratio by the fuel injection time TAU (determined from the KPA).

In addition to the system shown in FIG. 2, the first embodiment is applicable to an automotive vehicle of the type including an evaporated fuel purge system in which evaporated fuel stored in the canister 40 is supplied into the intake pipe 24 downstream of the throttle valve 25 and no purge control VSV 42 is provided.

Next, a description will be given of a second embodiment of the altitude determining apparatus according to the present invention with reference to FIGS. 13 through 15. This embodiment is applied to an automotive vehicle including an internal combustion engine with a supercharger. When the engine and the supercharger in the vehicle of this type are operating so as to supply air under high pressure to the intake passage of the engine, the density of intake air in the intake passage is greatly changed, so that the intake air flow rate is varied in different manners. The intake air flow rate when the supercharger is operating has no clear relationship with the atmospheric air density. At this time, it is very difficult to correctly determine a reference flow rate based on the engine speed and throttle angle in the vehicle of the type mentioned above.

In order to eliminate the above problem of the vehicle of the type including the supercharger, the second embodiment of the present invention is provided. FIG. 13 shows the second embodiment of the altitude determining apparatus according to the present invention. In FIG. 13, the parts which are the same as corresponding parts shown in FIG. 1 are designated by the same reference numerals, and a description thereof will be omitted.

Figure 13:
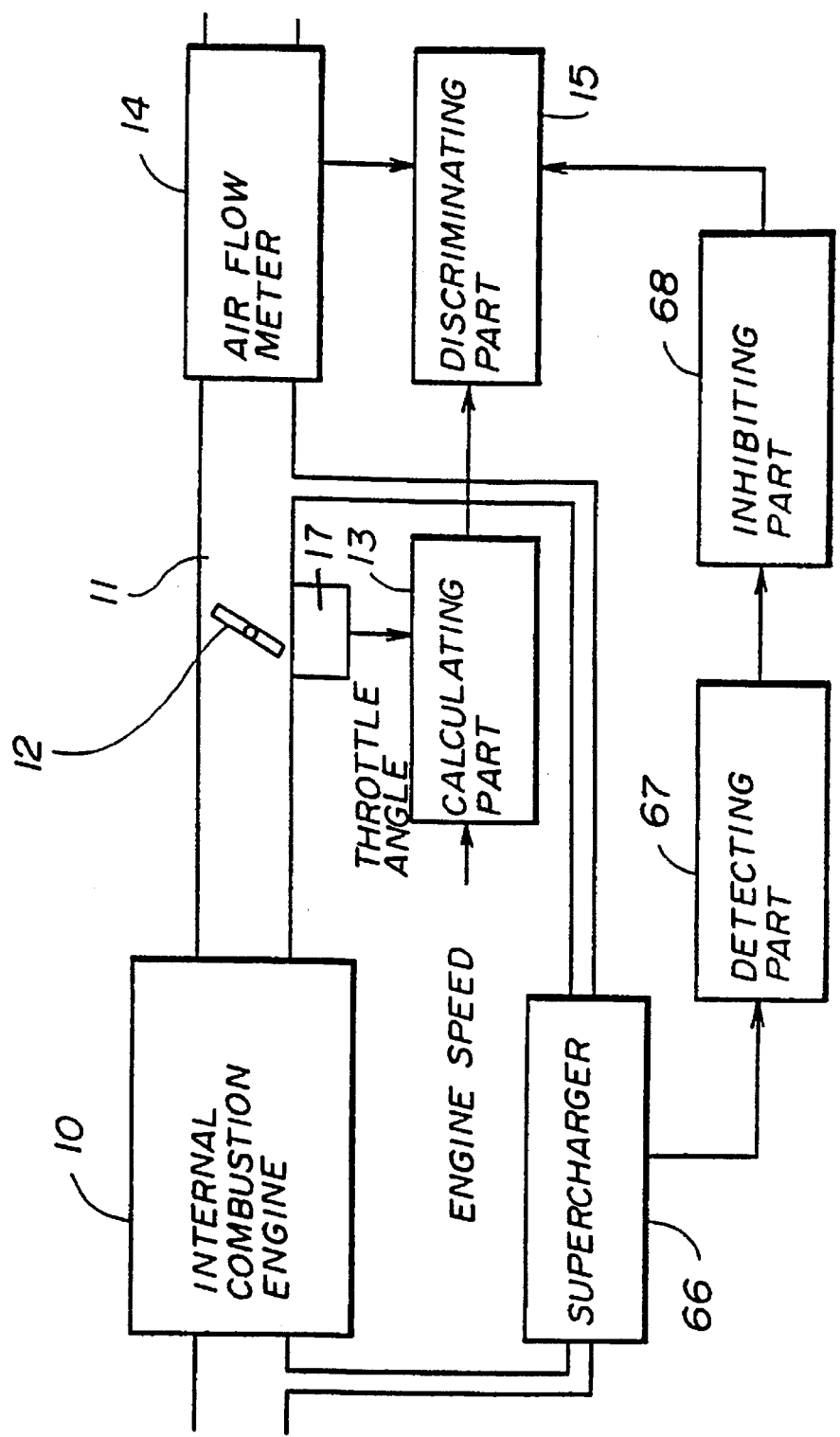
FIG. 13 is a block diagram showing a second embodiment of the altitude determining apparatus according to the present invention.

In the altitude determining apparatus shown in FIG. 13, the calculating part 13 determines a reference flow rate based on a sensed throttle angle of the throttle valve 12 and a sensed engine speed of the engine. The discriminating part 15 compares an intake air flow rate sensed by the air flow meter 14 at the inlet of the intake passage 11 with the reference flow rate determined by the calculating part 13. The discriminating part 15 determines an altitude condition of the vehicle based on the result of the above comparison.

The engine 10 in FIG. 13 includes a supercharger 66 for supplying compressed air to the intake passage 11. The altitude determining apparatus includes a detecting part 67 for detecting whether the supercharger 66 is operating so as to supply air under high pressure to the intake passage 11. The apparatus includes an inhibiting part 68 for inhibiting the comparison and determination of the discriminating part 15 when the detecting part 67 detects that the superchager 66 is operating. In this embodiment, an erroneous detection of an altitude condition of the vehicle during the operation of the supercharger 66 can be prevented.

Figure 14:
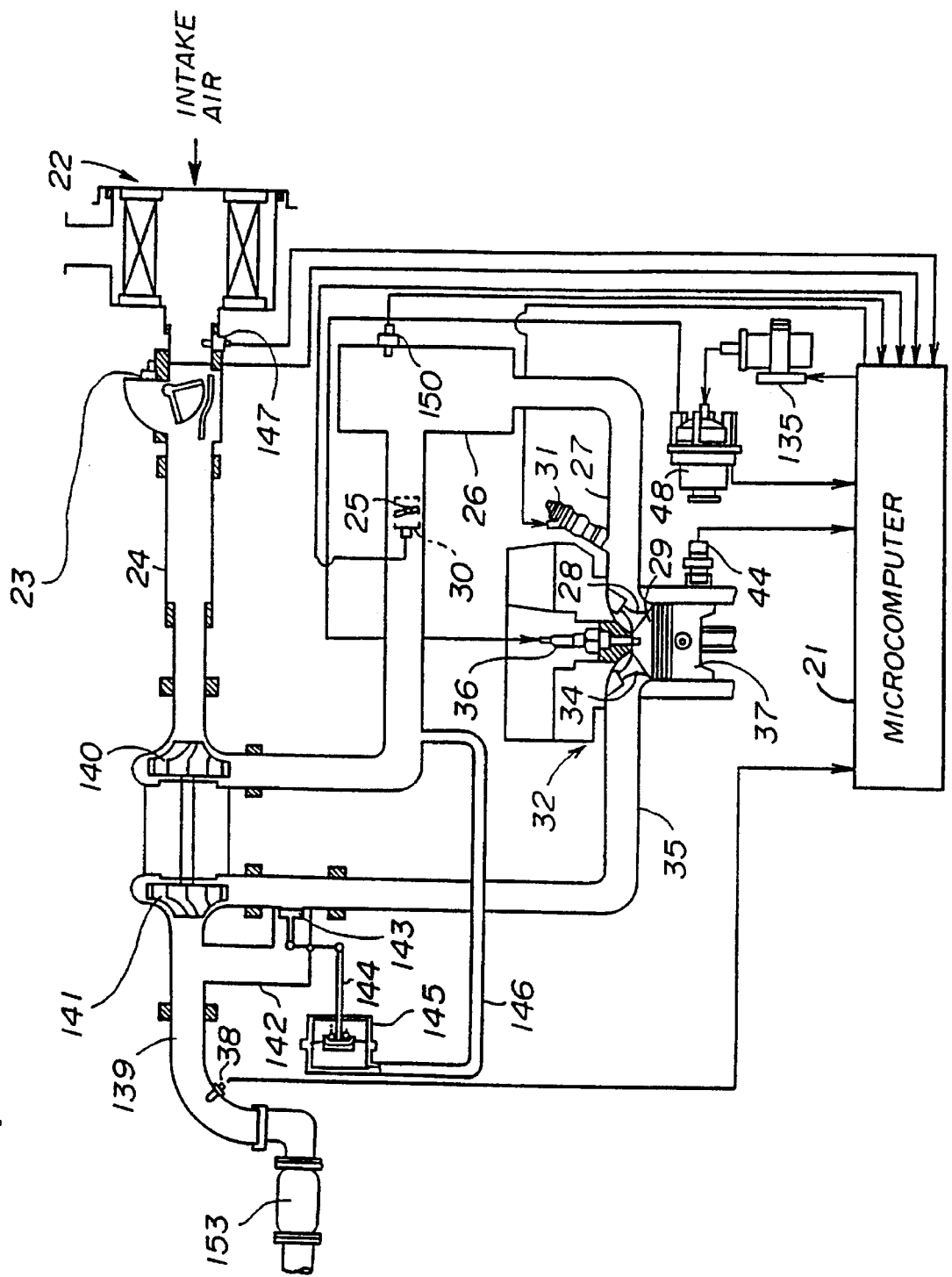
FIG. 14 is a system diagram showing a system of an automotive vehicle to which the second embodiment of the present invention is applied.

FIG. 14 shows a system of an automotive vehicle to which the second embodiment is applied. In FIG. 14, the parts which are the same as corresponding parts shown in FIG. 2 are designated by the same reference numerals, and a description thereof will be omitted.

In the system shown in FIG. 14, the internal combustion engine includes the air flow meter 23 at the inlet of the intake pipe 24 and a supercharger arranged in the engine. An igniter 135 is arranged in the engine to produce a high voltage of an ignition coil based on an ignition control signal from the microcomputer 21. This high voltage is supplied from the igniter 135 to the spark plug 36 through the distributor.

In the system shown in FIG. 14, a compressor 140 for supplying air under high pressure to the intake passage of the engine is arranged in an intermediate passage connected to the intake pipe 24 upstream of the throttle valve 25, and a turbine 141 having a rotating shaft by which the compressor 140 and the turbine 141 are commonly connected is arranged in an exhaust pipe 139. The exhaust pipe 139 is connected to the exhaust manifold 35 of the engine via the turbine 141.

A bypass passage 142 is arranged around the turbine 141 such that a portion of the exhaust manifold 35 upstream of the turbine 141 communicates with the exhaust pipe 139 downstream of the turbine 141 via the bypass passage 142. A waist gate valve 143 is arranged at the portion where the bypass passage 139 and the exhaust manifold 35 are connected to each other. An actuator 145 for operating the waist gate valve 143 is connected to the waist gate valve 143 through a link 144. In accordance with the controlling action of the actuator 145, the waist gate valve 143 functions to close or open the outlet of the exhaust manifold 35 so as to control the flow of exhaust gas from the engine to the turbine 141 or to the bypass passage 142. A passage 146 is arranged between the actuator 145 and the intake pipe 24 such that intake air passing through the intake pipe 24 enters the actuator 145. The operation of the actuator 145 is controlled based on the charge pressure of the air supplied from the compressor 140 to the actuator 145 through the passage 146.

The compressor 140 and the turbine 141 constitute a part of the supercharger of the engine shown in FIG. 14. The turbine 141 is rotated by exhaust gas passing through the exhaust manifold 35. The compressor 140 is also rotated in accordance with the rotation of the turbine 141 since the rotating shaft is arranged in common on the compressor 140 and the turbine 141. Intake air passing through the air flow meter 23 is compressed by the compressor 140, and the air under high pressure (hereinafter called the pressure-charged air) is supplied by the compressor 140 to the combustion chamber 29 of the engine through the surge tank 26 and the intake manifold 27, in order to increase the output power of the engine.

When the charge pressure of air supplied from the compressor 140 to the actuator 145 is lower than a given reference pressure, the actuator 145 is not operated in response to the charge pressure, so that the outlet of the exhaust manifold 35 leading to the bypass passage 142 is closed by the waist gate valve 143. Thus, all the exhaust gas from the engine is supplied to the turbine 141. On the other hand, the rotating speed of the engine becomes higher due to the pressure charging of the supercharger. When the charge pressure of air supplied from the compressor 140 to the actuator 145 is higher than the given reference pressure, the actuator 145 is operated in response to the charge pressure so that the outlet of the exhaust manifold 35 is opened by the waist gate valve 143. A certain amount of exhaust gas from the engine flows into the bypass passage 142. The amount of exhaust gas supplied to the turbine 141 is decreased, and the rotating speed of the turbine 141 becomes lower. Accordingly, the charge pressure of the air supplied from the compressor 140 to the combustion chamber 29 is controlled so as to be at a constant pressure.

In the system shown in FIG. 14, there are a few sensors which are different from the sensors of the system shown in FIG. 2. An air temperature sensor 147 is mounted at a portion of the intake pipe 24 upstream of the air flow meter 23, and the temperature of intake air passing through the air cleaner 22 is sensed by the air temperature sensor 147. A charge pressure sensor 150 is mounted at an inside wall of the surge tank 26 downstream of the throttle valve 25, and the pressure of the air in the intake passage is sensed by the charge pressure sensor 150. The oxygen sensor 38 is mounted at a portion of the exhaust pipe 139 upstream of a catalytic converter 153, and the concentration of oxygen gas in exhaust gas passing through the exhaust pipe 139 is sensed by the oxygen sensor 38. Output signals of these sensors are supplied to the microcomputer 21, and a determination as to how the altitude determining procedure is performed is made based on each of the output signals supplied from the sensors.

Next, the procedure of the second embodiment for determining an atmospheric pressure correction factor will be described with reference to FIG. 15. In FIG. 15, the steps which are the same as corresponding steps shown in FIG. 4 are designated by the same reference numerals, and a description thereof will be omitted. The KPA determining procedure shown in FIG. 15 is performed by the microcomputer 21 in FIG. 14 to determine an altitude condition of an automotive vehicle of the type including the engine with the supercharger described above. The functions of the calculating part 13, the discriminating part 15, the detecting part 67 and the inhibiting part 68 shown in FIG. 13 are achieved by performing the KPA determining procedure shown in FIG. 15.

Figure 15:
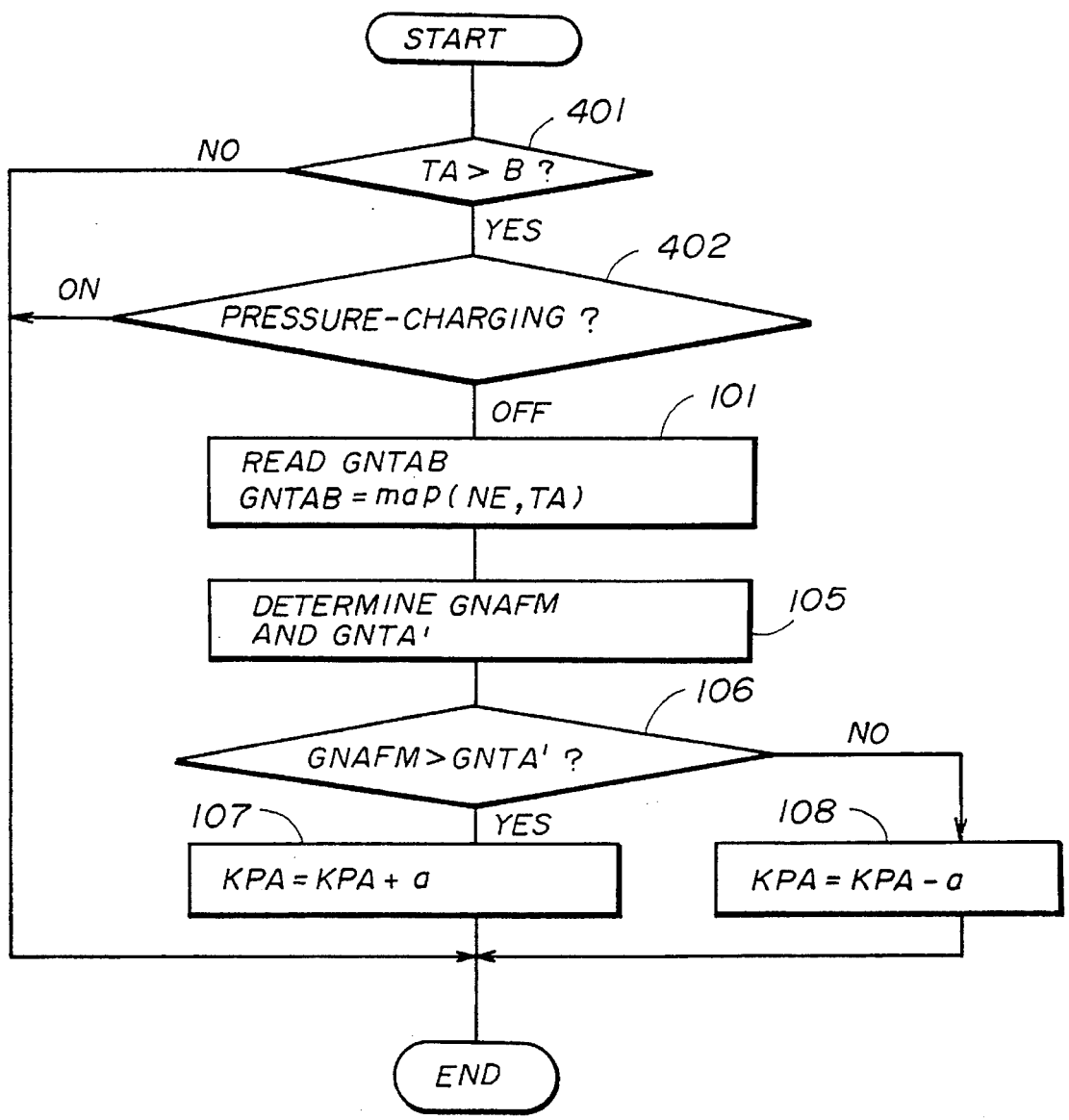
FIG. 15 is a flow diagram for explaining a procedure of the second embodiment for determining an atmospheric pressure correction factor.

The procedure in FIG. 15 is repeatedly performed by the microcomputer 21 at given time intervals. After a throttle angle TA of the throttle valve 25 is sensed by the throttle position sensor 30, the CPU 50 detects whether the throttle angle TA is greater than a predetermined value B in step 401. If the answer to step 401 is negative (TA≦B), the procedure in FIG. 15 is finished. In order to increase the reliability of the altitude determination, it is necessary that the atmospheric pressure correction factor KPA be updated only when the throttle angle TA is greater than the value B.

If the answer to step 401 is affirmative (TA>B), step 402 detects whether the supercharger is operating to supply air under high pressure to the intake passage of the engine, based on the output signal supplied from the charge pressure sensor 150. When the output signal of the sensor 150 indicates a voltage lower than a prescribed voltage in step 402, it is determined that no pressure-charged air is supplied from the compressor 140 to the intake manifold 27 of the engine. Since the actual intake air flow rate and the reference flow rate at this time have a close relationship between them, the following steps 101–108 which are the same as corresponding steps shown in FIG. 4 are performed in order to determine an atmospheric pressure correction factor KPA.

When the output signal of the sensor 150 indicates a voltage higher than the prescribed voltage in step 402, it is determined that the supercharger is operating to supply air under high pressure to the intake manifold 27 of the engine. The CPU 50 at this time inhibits the following steps 101–108 from being performed. When the supercharger is operating, the intake air flow rate has no relationship with the atmospheric air density, and a reference flow rate cannot correctly be determined based on the engine speed and throttle angle.

In this manner, the CPU 50 updates the atmospheric pressure correction factor KPA based on the result of the above comparison. The thus determined correction factor KPA indicates a corrected altitude condition of the vehicle. For example, as shown in FIG. 11, it is possible to correctly determine a fuel injection time TAUST of the starting of the engine operation based on the atmospheric pressure correction factor KPA determined by the KPA determining procedure shown in FIG. 15. Also, it is possible to correctly determine a maximum guard value GNMAX during the engine operation based on the atmospheric pressure correction factor KPA.

In addition, it is possible that the second embodiment of the present invention is applied to an automotive vehicle of the type including the EGR system or the EFP system. It is readily understood that if the steps 102–104 in FIG. 4 or the steps 201–205 in FIG. 9 are added to the KPA determining procedure of the second embodiment described above the function of the correction part 16 is achieved.

Next, a description will be given, with reference to FIGS. 16 through 18, of a third embodiment of the altitude determining apparatus according to the present invention.

Generally, the density of intake air in an automotive vehicle varies depending on not only the atmospheric pressure but also the atmospheric air temperature. When the intake passage is warmed by the heat of the engine during the operation of the engine, the intake air expands in volume by the heat of the intake passage before the intake air enters the combustion chamber of the engine. Thus, it is likely that a certain amount of the intake air passing through the air flow meter cannot enter the combustion chamber when the intake passage is warmed during the operation of the engine.

In a case of a conventional altitude determining device, an intake air temperature sensor is arranged in the intake passage to sense the temperature of intake air, and an altitude condition of the vehicle is determined by compensating for the influence of the intake air temperature on the altitude determination. The conventional device requires an intake air temperature sensor, and the manufacturing cost is thereby increased.

In the conventional altitude determining device, the altitude determination when the engine has started operating under a warm start condition is made in a manner similar to the manner when the engine has started operating under a cold start condition. However, during the warm starting of the engine, the difference in temperature between the atmospheric air and the intake air of the combustion chamber becomes large, and the altitude determination is significantly influenced by the intake air temperature. On the other hand, during the cold starting of the engine, the intake air temperature is substantially the same as the atmospheric air temperature. For this reason, the reliability of the altitude determination by the conventional device is low, and the driveability of the vehicle upon starting of the engine operation becomes poor.

In order to eliminate the above mentioned problem, the third embodiment of the present invention is provided. FIG. 16 shows the third embodiment of the altitude determining apparatus according to the present invention. In FIG. 16, the parts which are the same as corresponding parts shown in FIG. 1 are designated by the same reference numerals, and a description thereof will be omitted.

Figure 16:
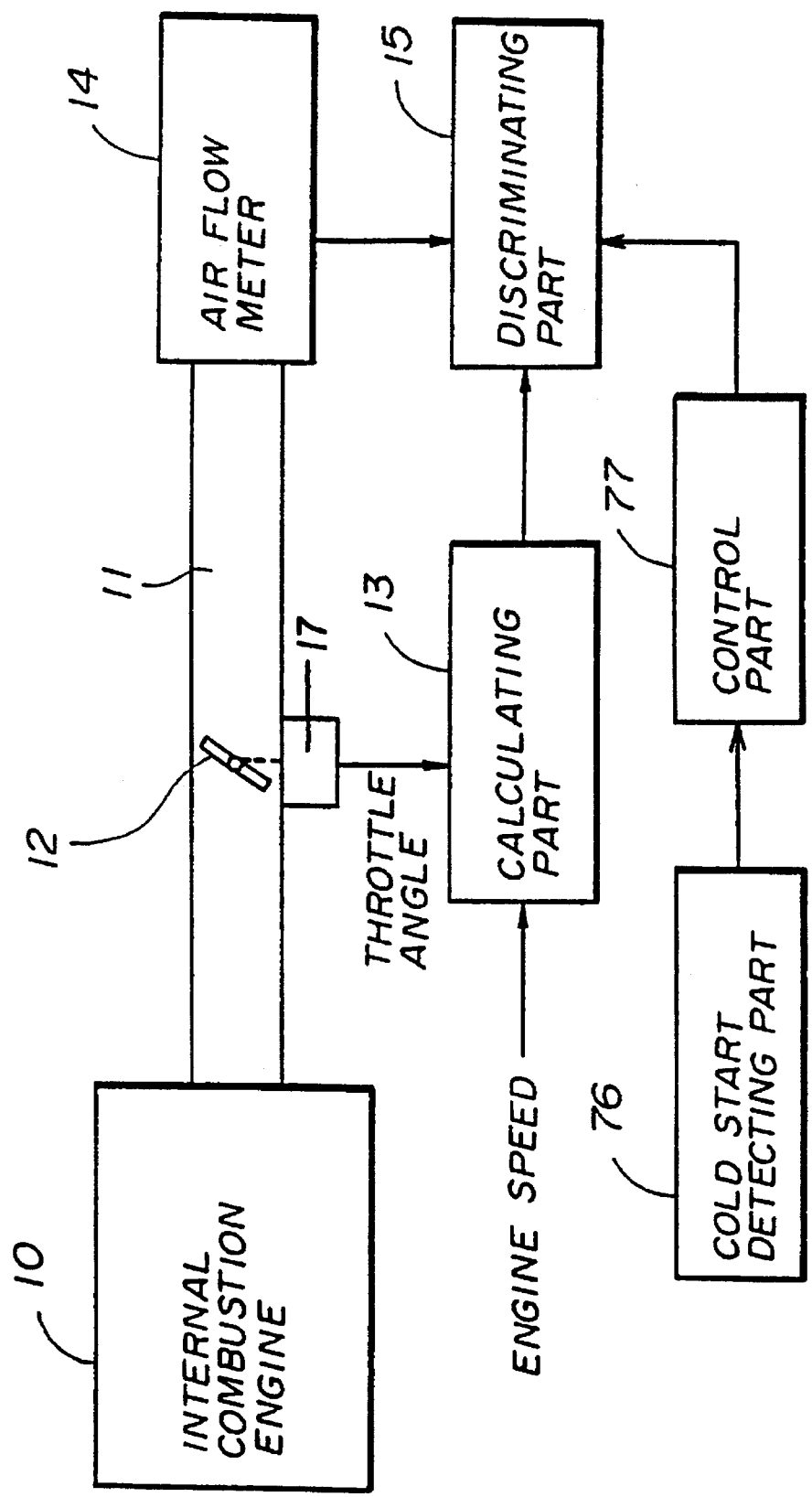
FIG. 16 is a block diagram showing a third embodiment of the present invention.

In the altitude determining apparatus shown in FIG. 16, the calculating part 13 determines a reference flow rate based on a sensed throttle angle of the throttle valve 12 and a sensed engine speed of the engine. The discriminating part 15 compares an intake air flow rate sensed by the air flow meter 14 at the inlet of the intake passage 11 with the reference flow rate determined by the calculating part 13. The discriminating part 15 updates a correction factor relating to an altitude condition of the vehicle based on the result of the above comparison. The correction factor is updated by adding a change value to the correction factor when the intake air flow rate is greater than the reference flow rate, or subtracting the change value from the correction factor when the intake air flow rate is not greater than the reference flow rate.

The altitude determining apparatus in FIG. 16 includes a cold start detecting part 76 for detecting whether the engine has started operating under a cold start condition. The altitude determining apparatus includes a control part 77 coupled to the cold start detecting part 76 for changing the change value of the discriminating part 15 to a second change value when the cold start detecting part 76 detects that the engine has started operating under the cold start condition. The second change value is greater than a first change value of the discriminating part 15 when the cold start detecting part 76 detects that the engine has started operating under a different start condition. In this embodiment, the correction factor relating to the altitude condition is updated by using a greater change value for the cold starting of the engine and it is updated by using a smaller change value for the other starting condition. When the engine has started operating under a cold start condition, the intake air temperature is substantially the same as the atmospheric air temperature. The reliability of the altitude determination is remarkably increased. In addition, the altitude determining apparatus of the third embodiment does not require an intake air temperature sensor.

Figure 17:
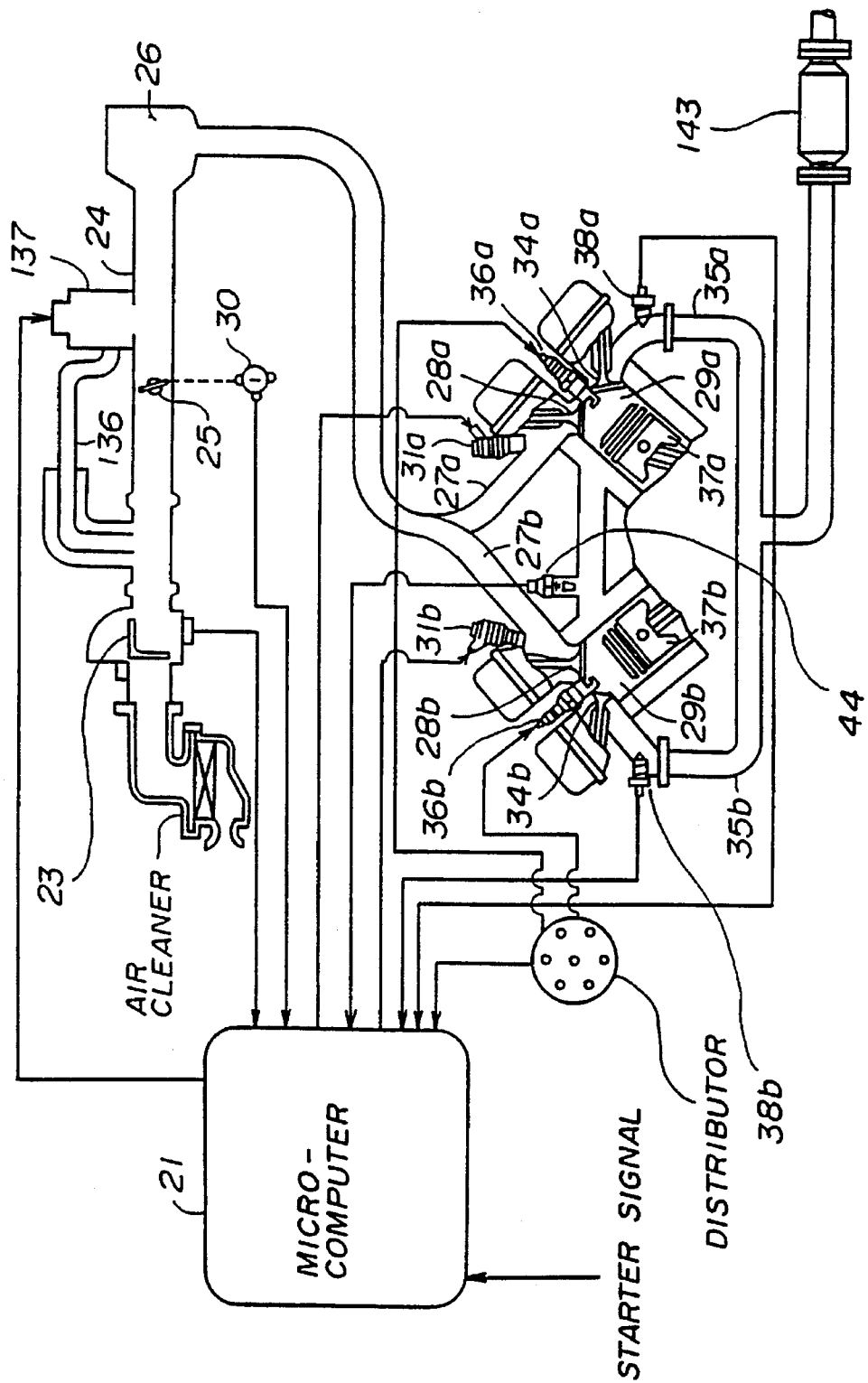
FIG. 17 is a system diagram showing a system of an automotive vehicle to which the third embodiment of the present invention is applied; 1

FIG. 17 shows a system of an automotive vehicle to which the third embodiment of the present invention is applied. In FIG. 17, the parts which are the same as corresponding parts shown in FIG. 2 are designated by the same reference numerals, and a description thereof will be omitted.

In the system shown in FIG. 17, the internal combustion engine is a multi-cylinder, spark-ignition-type engine. In FIG. 17, only two cylinders from among a plurality of cylinders of the engine, and only the parts relating to the two cylinders are shown, for the sake of convenience. The engine in FIG. 17 includes the air flow meter 23 arranged at the inlet of the intake pipe 24 to sense an intake air flow rate. In the intake pipe 24, the throttle valve 25 is arranged, and the throttle valve 25 is set to a throttle angle according to a position of the accelerator pedal set by a vehicle operator. This throttle angle is sensed by the throttle position sensor 30. A bypass passage 136 is arranged in the intake pipe 24 so as to bypass the throttle valve 25. An idling speed control valve (ISCV) 137 is mounted at a portion of the bypass passage 137, and the ISCV 137 controls the flow of intake air supplied to the engine during an idling condition of the engine. The valve opening position of the ISCV 137 is adjusted by supplying a control signal to a solenoid. The intake pipe 24 is connected to the intake manifold of the engine through the surge tank 26.

In the engine in FIG. 17, two fuel injection valves 31a and 31b relating to the two cylinders are arranged, and the valves partially project into intake manifold portions 27a and 27b, respectively. The other fuel injection valves relating to the other cylinders are also arranged. However, those valves are not shown in FIG. 17 for the sake of convenience. In the engine in FIG. 17, two pistons 37a and 37b are arranged in the engine block such that each piston moves up and down during the operation of the engine. Two combustion chambers 29a and 29b communicate with the intake pipe 24 via intake valves 28a and 28b, respectively. On the other hand, the combustion chambers 29a and 29b communicate with exhaust manifold portions 35a and 35b via exhaust valves 34a and 34b, respectively. Two spark plugs 36a and 36b are arranged on the combustion chambers 29a and 29b, and leading edges of the plugs respectively project into the combustion chambers 29a and 29b. Two oxygen sensors 38a and 38b are mounted on the exhaust manifold, and a concentration of oxygen gas in exhaust gas from the engine is sensed by each of the sensors 38a and 38b. A three-way catalytic converter 143 is arranged at an intermediate portion of the exhaust pipe downstream of the exhaust manifold of the engine.

Next, the procedure of the third embodiment for determining an atmospheric pressure correction factor will be described with reference to FIG. 18. In FIG. 18, the steps which are the same as corresponding steps shown in FIG. 4 are designated by the same reference numerals, and a description thereof will be omitted. The KPA determining procedure in FIG. 18 is performed by the microcomputer 21 in FIG. 17 to determine an altitude condition of the vehicle. The functions of the calculating part 13, the discriminating part 15, the cold start detecting part 76 and the control part 77 described above are achieved by performing the KPA determining procedure in FIG. 18.

Figure 18:
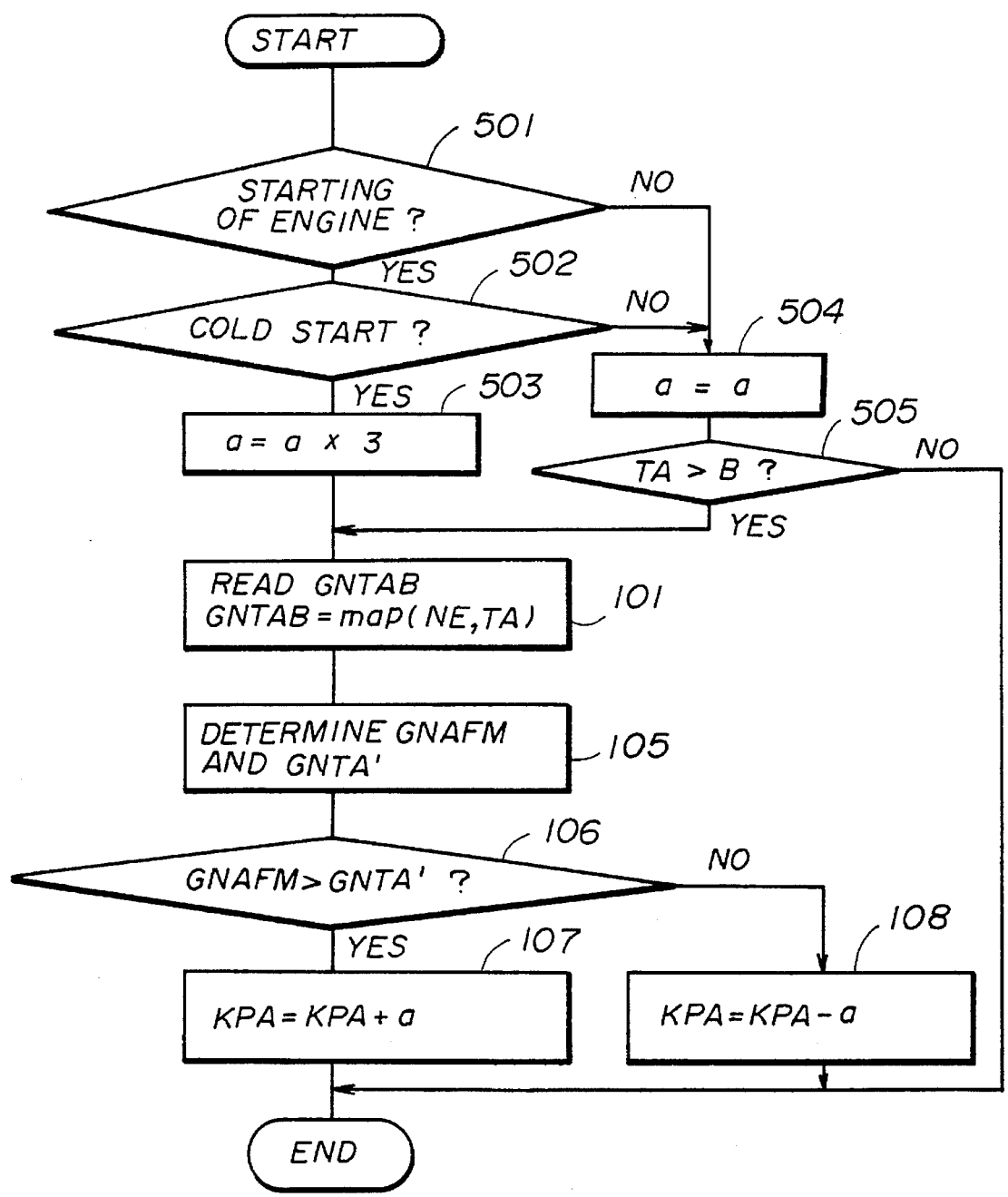
FIG. 18 is a flow diagram for explaining a procedure of the third embodiment for determining an atmospheric pressure correction factor.

The procedure in FIG. 18 is repeatedly performed by the microcomputer 21 at given time intervals. After the procedure in FIG. 18 is started, the CPU 50 detects in step 501 whether the engine has started operating. This detection is made depending on whether a starter signal is input to the microcomputer 21. If the answer to step 501 is affirmative, step 502 detects whether the engine has started operating under a cold start condition based on a signal output from the water temperature sensor 44. When the output signal of the sensor 44 indicates a temperature of engine cooling water lower than a prescribed reference temperature, it is detected that the engine has started operating under a cold start condition. When the output signal of the sensor 44 indicates a temperature of engine cooling water higher than the reference temperature, it is detected that the engine has started operating under a different start condition.

If the answer to step 502 is affirmative, it is determined that the engine has started operating under a cold start condition. Step 503 changes a change value of the atmospheric pressure correction factor KPA to a second change value that is three times as great as a first change value "a" used when the engine is operating under an operating condition that is different from the cold start condition (a=a×3). During the cold starting of the engine, the atmospheric pressure correction factor KPA is rapidly updated. The duration of the starting of the engine is small, and there is no substantial difference between the intake air temperature and the atmospheric air temperature. For this reason, the correction factor KPA can be updated to an appropriate value for indicating an accurate altitude condition of the vehicle.

After step 503 is performed, the steps 101–108 which are the same as corresponding steps shown in FIG. 4 are performed to update the atmospheric pressure correction factor KPA.

If the answer to either step 501 or step 502 is negative, it is determined that the operating condition of the engine is different from the cold start condition. Step 504 sets the change value of the correction factor KPA to the above mentioned first change value "a" (a=a). After step 504 is performed, step 505 detects whether the throttle angle TA sensed by the throttle position sensor 30 is greater than a prescribed angle B. This step 505 is the same as the step 401 in FIG. 15. At this time, the valve opening width of the ISCV 37 is negligible when compared to the valve opening width of the throttle valve 25. If the answer to step 505 is negative (TA≦B), the procedure in FIG. 18 is finished. In order to increase the reliability of the altitude determination, it is necessary that the atmospheric pressure correction factor KPA be updated only when the throttle angle TA is greater than the value B.

If the answer to step 505 is affirmative (TA>B), the steps 101–108 which are the same as corresponding steps shown in FIG. 4 are performed to update the atmospheric pressure correction factor KPA in a manner as previously described with reference to FIG. 15.

In this manner, the CPU 50 updates the atmospheric pressure correction factor KPA based on the result of the above comparison. The thus determined correction factor KPA indicates a corrected altitude condition of the vehicle. For example, as shown in FIG. 11, it is possible to correctly determine a fuel injection time TAUST of the starting of the engine operation based on the atmospheric pressure correction factor KPA determined by the KPA determining procedure shown in FIG. 15. Also, it is possible to correctly determine a maximum guard value GNMAX during the engine operation based on the atmospheric pressure correction factor KPA.

In addition, it is possible that the third embodiment described above is applied to an automotive vehicle of the type including the EGR system or the EFP system. It is readily understood that if the steps 102–104 in FIG. 4 or the steps 201–205 in FIG. 9 are added to the KPA determining procedure of the third embodiment described above the function of the correction part 16 according to the present invention is achieved.

Next, a description will be given, with reference to FIGS. 19 through 21, of a fourth embodiment of the altitude determining apparatus according to the present invention.

Generally, the throttle position sensor 17 which senses a throttle angle of the throttle valve 12 arranged in the intake passage 11 outputs a signal indicating the sensed throttle angle with an indication error due to a mechanical error of the sensor 17 or a secular change thereof. In a case of a conventional altitude determining device, there is a difference between the true throttle angle of the throttle valve 12 and the throttle angle sensed by the throttle position sensor 17.

On the other hand, the intake air flow rate GNAFM (per revolution of the engine crankshaft) increases in proportion to the increase of the throttle angle TA. However, if the engine speed NE is relatively low, the intake air flow rate GNAFM does not increase in proportion to the increase of the throttle angle TA and does not become greater than a prescribed flow rate when the throttle angle TA is greater than a prescribed angle.

Figure 21:
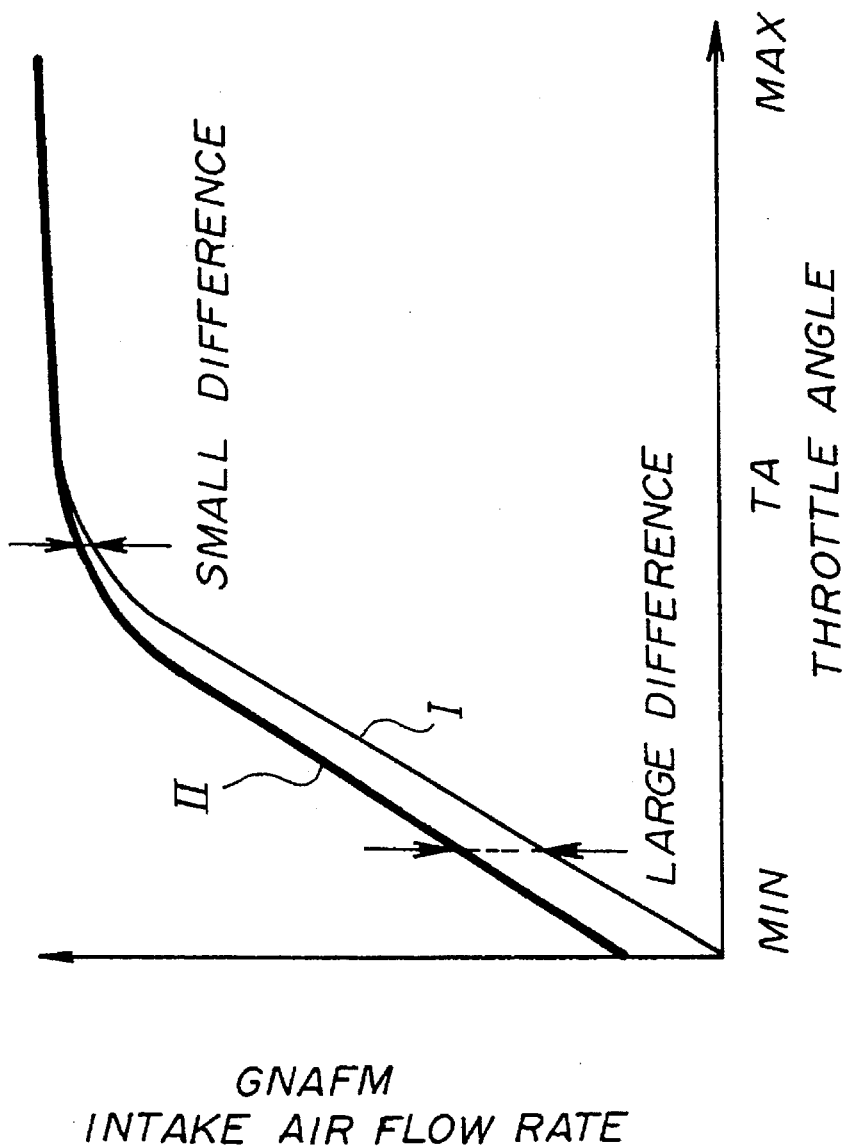
FIG. 21 is a chart showing the difference of the intake air flow rate in response to the throttle angle due to an error of a throttle position sensor.

FIG. 21 shows the difference in the intake air flow rate GNAFM in response to the throttle angle TA. As a line I in FIG. 21 is assumed to indicate the characteristic of the intake air flow rate GNAFM in response to the true throttle angle of the throttle valve, a line II in FIG. 21 indicates the characteristic of the intake air flow rate GNAFM in response to the throttle angle TA sensed by the throttle valve having a mechanical error. As shown in FIG. 21, when the throttle angle TA is greater than a prescribed angle, the difference between the two intake air flow rates is relatively small. However, when the throttle angle TA is smaller than the prescribed angle, the difference between the two intake air flow rates becomes great. Therefore, in a case of a conventional altitude determining device, the determined altitude condition of the vehicle may have a significant error when the throttle angle TA is smaller than the prescribed angle.

In order to eliminate the above problem, the fourth embodiment of the present invention is provided. FIG. 19 shows the fourth embodiment of the altitude determining apparatus according to the present invention. In FIG. 19, the parts which are the same as corresponding parts shown in FIG. 1 are designated by the same reference numerals, and a description thereof will be omitted.

Figure 19:
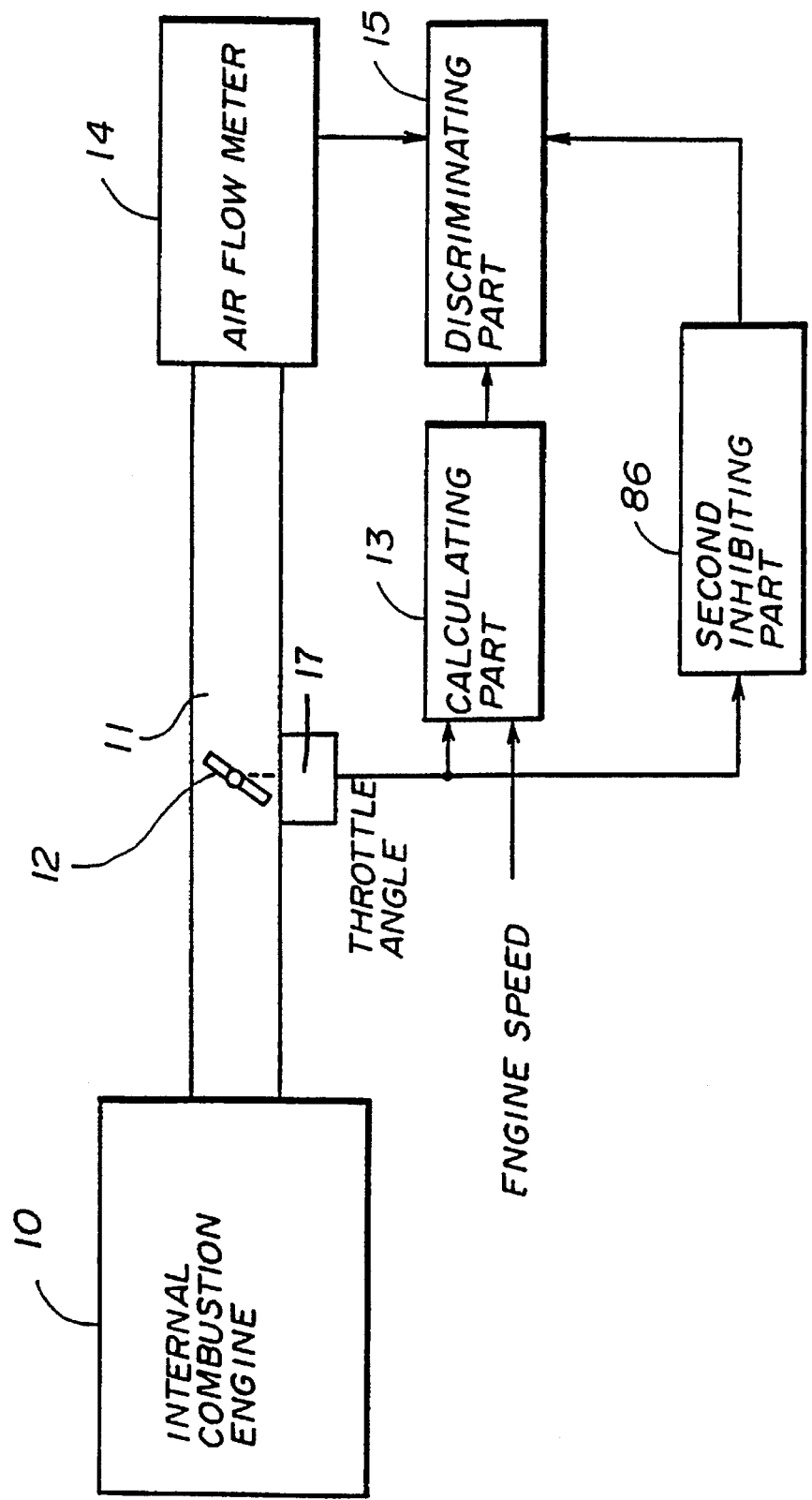
FIG. 19 is a block diagram showing a fourth embodiment of the present invention.

In the altitude determining apparatus shown in FIG. 19, the calculating part 13 determines a reference flow rate based on a sensed throttle angle of the throttle valve 12 and a sensed engine speed of the engine. The discriminating part 15 compares an intake air flow rate sensed by the air flow meter 14 at the inlet of the intake passage 11 with the reference flow rate determined by the calculating part 13. The discriminating part 15 determines an altitude condition of the vehicle based on the result of the above comparison.

The altitude determining apparatus in FIG. 19 includes a second inhibiting part 86 for detecting whether the throttle angle of the throttle valve 12 is greater than a prescribed value, and for inhibiting the comparison and determination of the discriminating part 15 when it is detected that the throttle angle is not greater than the prescribed value. In this embodiment, it is possible to eliminate an undesired influence on the intake air flow rate sensed by the air flow meter due to the error of the throttle position sensor. As an accurate altitude condition of the vehicle can be detected, the reliability of the determined altitude condition is increased.

Figure 20:
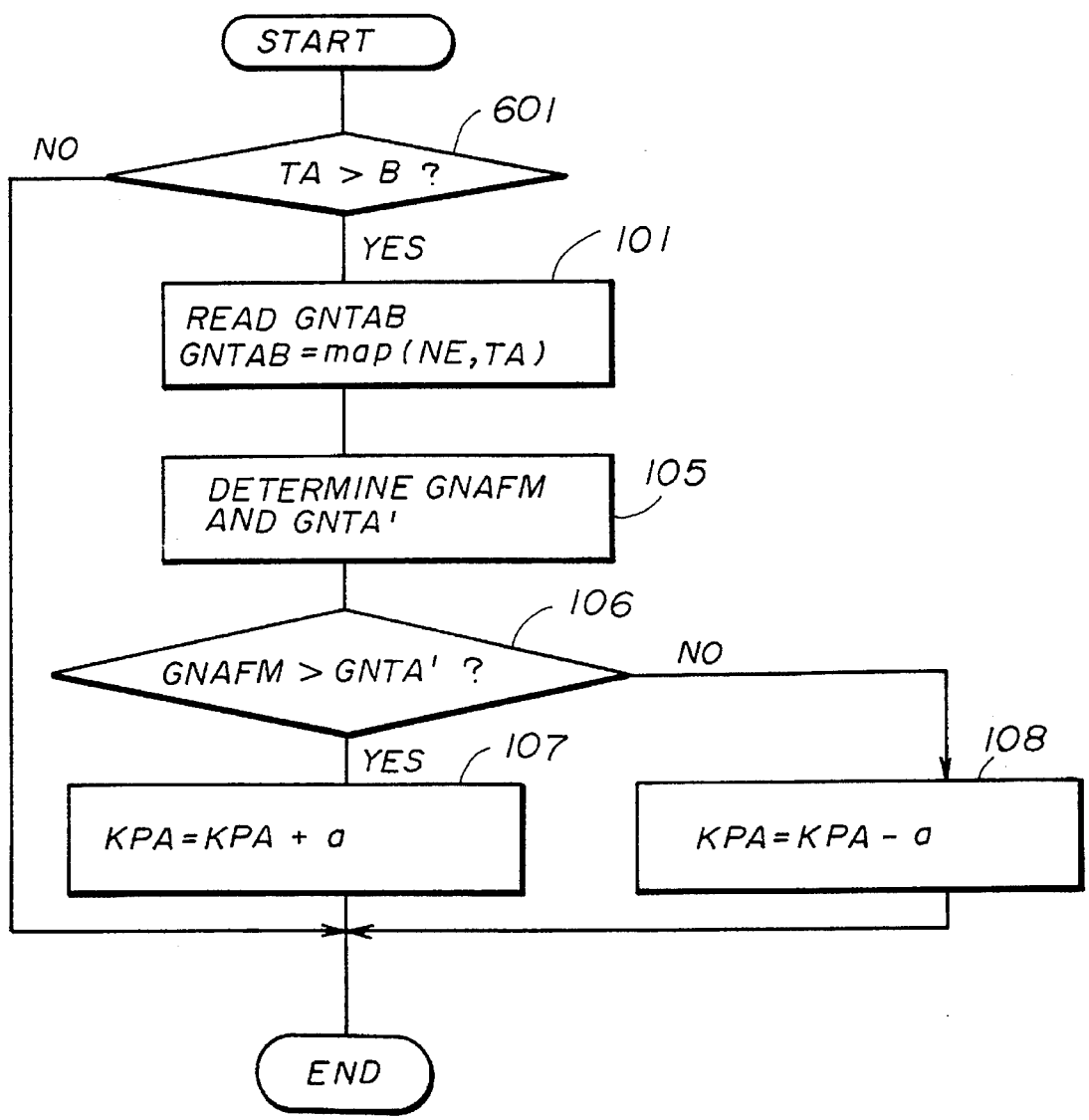
FIG. 20 is a flow diagram for explaining a procedure of the fourth embodiment for determining an atmospheric pressure correction factor.

FIG. 20 shows a procedure of the fourth embodiment for determining an atmospheric pressure correction factor. In FIG. 20, the steps which are the same as corresponding steps shown in FIG. 4 are designated by the same reference numerals, and a description thereof will be omitted. The functions of the calculating part 13, the discriminating part 15 and the second inhibiting part 86 described above are achieved by performing the procedure shown in FIG. 20 by means of the microcomputer 21 in FIG. 2.

The procedure in FIG. 20 is repeatedly performed by the microcomputer 21 at given time intervals (for example, every 65 milliseconds). After a throttle angle TA is sensed by the throttle position sensor 30 from the throttle valve 25, the CPU 50 detects in step 601 whether the throttle angle TA is greater than a predetermined angle B. This angle B corresponds to a relatively large throttle angle TA (for example, 30 degrees) from which the intake air flow rate GNAFM substantially reaches the saturation level as shown in FIG. 21.

If the answer to step 601 is negative (TA≦B), the procedure of the fourth embodiment is finished. In other words, when the throttle angle TA is smaller than the angle B and the intake air flow rate GNAFM may have a sensing error, the CPU 50 does not update the atmospheric pressure correction factor KPA. In the procedure of the fourth embodiment mentioned above, the atmospheric pressure correction factor KPA is updated only when the throttle angle TA is greater than the predetermined angle B. As the atmospheric pressure correction factor KPA is not updated when the throttle angle TA is smaller than the angle B, it is possible to increase the reliability of the determined altitude condition of the vehicle.

If the answer to step 601 is affirmative (TA>B), the steps 101 through 108 which are the same as corresponding steps shown in FIG. 4 are performed, as shown in FIG. 20. In a manner similar to that of the procedure of the first embodiment described above, the CPU 50 updates the atmospheric pressure correction factor KPA based on the result of the comparison made in step 106. Based on the atmospheric pressure correction factor KPA determined in step 107 or step 108, an accurate fuel injection time TAUST at the start of the engine operation can be correctly determined. Also, in the procedure of the fourth embodiment, an accurate maximum guard value GNMAX during the engine operation can be correctly determined based on the thus determined atmospheric pressure correction factor KPA.

In addition, the KPA determining procedure of the fourth embodiment can be applied to the automotive vehicle of the above described type including either the EGR system or the FEP system. It is readily understood that if the above described steps 102–104 in FIG. 4 or the above described steps 201–205 in FIG. 9 are added to the KPA determining procedure shown in FIG. 20 the function of the correction part 16 of the present invention can be achieved in a manner similar to the manner shown in FIG. 4 or FIG. 9.

Further, the present invention is not limited to the above described embodiments, and variations and modifications may be made without departing from the scope of the present invention.

What is claimed is:

1. An apparatus for determining an altitude condition of an automotive vehicle, said apparatus comprising:

an internal combustion engine having a throttle valve arranged in an intake passage and an air flow meter arranged at an inlet portion of the intake passage;

calculating means for determining a reference air flow rate based on a throttle angle sensed from said throttle valve and an engine speed sensed from said engine;

correction means for detecting an operating condition of the engine under which additive gas is supplied to the intake passage downstream of the throttle valve, and for changing said reference air flow rate determined by said calculating means to a second reference air flow rate according to said operating condition only when said operating condition of the engine is detected; and discriminating means coupled to said correction means for comparing an intake air flow rate sensed by said air flow meter with a reference air flow rate supplied from said correction means, and for determining an altitude condition of the automotive vehicle based on the result of said comparison, wherein said correction means includes detecting means for detecting whether additive gas is supplied to said intake passage and operation of said internal combustion engine is adjusted to compensate for the determined altitude condition.

2. An apparatus according to claim 1, wherein said correction means detects whether an exhaust gas recirculation control valve arranged in an exhaust gas passage is opened so as to supply exhaust gas from the engine, as the additive gas, to the intake passage through the exhaust gas passage.

3. An apparatus according to claim 1, wherein said correction means detects whether a purge control valve arranged in a purge passage is opened so as to supply fuel vapor, as the additive gas, from a canister to the intake passage through the purge passage.

4. An apparatus according to claim 1, wherein said apparatus comprises second correction means for changing the intake air flow rate sensed by the air flow meter to the second reference intake air flow rate according to said reference operating condition detected by said correction means only when said operating condition is detected.

5. An apparatus according to claim 1, wherein said apparatus comprises inhibiting means for detecting whether said throttle angle is greater than a reference angle, and for inhibiting said comparison and determination of said discriminating means when said inhibiting means detects that the throttle angle is not greater than the reference angle.

6. An apparatus for determining an altitude condition of an automotive vehicle, comprising:

an internal combustion engine including an air flow meter arranged at an inlet of an intake passage and a supercharger for supplying compressed air to the intake passage;

calculating means for determining a reference flow rate based on a throttle angle of a throttle valve and an engine speed of the engine, said throttle angle being arranged in the intake passage, and said throttle angle being sensed from the throttle valve;

discriminating means for comparing an intake air flow rate sensed by said air flow meter with a reference flow rate determined by said calculating means, and for determining an altitude condition of the automotive vehicle based on the result of said comparison;

detecting means for detecting whether said supercharger is operating so as to supply compressed air to the intake passage; and inhibiting means coupled to said discriminating means and said detecting means for inhibiting said comparison and determination of said discriminating means when said detecting means detects that said supercharger is operating, wherein said inhibiting means allows said discriminating means to perform said comparison and said determination when said detecting means detects that the supercharger is not operating so as to supply compressed air to the intake passage, so that an altitude condition of the vehicle based on the result of the comparison is determined and operation of said internal combustion engine is adjusted to compensate for the determined altitude condition.

7. An apparatus according to claim 6, wherein said detecting means comprises a charge pressure sensor mounted at an intermediate portion of the intake passage, and said inhibiting means inhibiting said comparison and determination of said discriminating means when a signal output by said charge pressure sensor indicates a charge pressure higher than a reference pressure.

8. An apparatus according to claim 6, wherein said detecting means comprises a charger pressure sensor mounted at an intermediate portion of the intake passage, and said inhibiting means allowing said discriminating means to perform said comparison and determination when a signal output by said charge pressure sensor indicates a charge pressure lower than a reference pressure.

9. An apparatus according to claim 6, wherein said apparatus comprises second inhibiting means coupled to said discriminating means for detecting whether said throttle angle is greater than a prescribed angle, and for inhibiting said comparison and determination of said discriminating means when said second inhibiting means detects that the throttle angle is not greater than the prescribed angle.

10. An apparatus for determining an altitude condition of an automotive vehicle, said apparatus comprising:

an internal combustion engine having a throttle valve arranged in an intake passage and an air flow meter arranged at an inlet portion of the intake passage, said throttle valve downstream of said air flow meter with respect to an air flow direction;

calculating means for determining a reference flow rate based on a throttle angle sensed from said throttle valve and an engine speed sensed from said engine;

discriminating means for comparing an intake air flow rate sensed by the air flow meter with the reference flow rate determined by said calculating means, and for updating a correction factor relating to an altitude condition of the vehicle based on the result of said comparison, said correction factor being updated by adding a change value to the correction factor when the intake air flow rate is greater than the reference flow rate, or subtracting the change value from the correction factor when the intake flow rate is not greater than the reference flow rate;

cold start detecting means for detecting whether the engine has started operating under a cold start condition; and control means coupled to said cold start detecting means for changing the change value of said discriminating means to a second change value when said cold start detecting means detects that the engine has started operating under the cold start condition, said second change value being greater than a first change value of said discriminating means when said cold start detecting means detects that the engine has started operating under a different start condition, wherein said cold start detecting means detects that the engine has started operating when a starter signal is supplied to a microcomputer arranged in the engine.

11. An apparatus according to claim 10, wherein said cold start detecting means comprises a water temperature sensor arranged on the engine to sense a temperature of engine cooling water, and said cold start detecting means detecting that the engine has started operating under the cold start condition when the temperature sensed by said water temperature sensor is lower than a prescribed reference temperature.

12. An apparatus according to claim 10, wherein said apparatus comprises inhibiting means coupled to said discriminating means for detecting whether said throttle angle is greater than a prescibed angle, and for inhibiting said comparison and determination of said discriminating means when said inhibiting means detects that the throttle angle is not greater than the prescibed angle.

* * * * *